US006804817B1

(12) United States Patent
Kimura et al.

(10) Patent No.: US 6,804,817 B1
(45) Date of Patent: Oct. 12, 2004

(54) INFORMATION-OBJECT DESIGNATION SYSTEM

(75) Inventors: Shinta Kimura, Kawasaki (JP); Yasuo Satoh, Kawasaki (JP); Tomio Koide, Tachikawa (JP)

(73) Assignee: Fujitsu Limited, Kawasaki (JP)

( * ) Notice: Subject to any disclaimer, the term of this patent is extended or adjusted under 35 U.S.C. 154(b) by 1 day.

(21) Appl. No.: 09/026,916

(22) Filed: Feb. 20, 1998

(30) Foreign Application Priority Data

Aug. 8, 1997 (JP) ............................................. 9-215309

(51) Int. Cl.$^7$ ................................................ G06F 9/44
(52) U.S. Cl. ...................... 719/315; 719/313; 719/318; 719/320; 704/231; 345/728
(58) Field of Search ................................ 709/310, 315, 709/318, 328, 100; 707/103; 719/313, 315, 318, 320; 704/231–257, 270; 345/727–729; 718/102

(56) References Cited

U.S. PATENT DOCUMENTS 5,252,951 A  * 10/1993 Tannenbaum et al. ...... 345/156
5,692,129 A  * 11/1997 Sonderegger et al. ......... 707/10
5,922,054 A  *  7/1999 Bibayan ...................... 707/205
6,047,312 A  *  4/2000 Brooks et al. .............. 709/203

FOREIGN PATENT DOCUMENTS

JP              5-204573            8/1993

OTHER PUBLICATIONS

Long, Allan Christian et al. "A Protytype User Interface for a Mobile Multimedia Termainal" May 7–11, 1995, p. 81–82.*

* cited by examiner

Primary Examiner—Lewis A. Bullock, Jr.
(74) Attorney, Agent, or Firm—Staas & Halsey LLP

(57) ABSTRACT

An information-object designation system in which two character strings, a character string expressive of a name of each of information objects stored in an information processing system, and a character string based on externally inputted information, are compared, and in which when a match of the two character strings has been detected, an event is commenced for the information object having the name expressed by the matching character string.

27 Claims, 31 Drawing Sheets

| ID | NAME | OPERATION | CONTENTS | ICON |
|---|---|---|---|---|
| 1 | EDIT | RUN | (PROGRAM) | (ICON IMAGE #1) |
| 2 | WRITTEN REPORT | OPEN WITH "EDIT" | (TEXT) | (ICON IMAGE #2) |
| 3 | | | | |

FIG. 1B
(PRIOR ART)

| ID | NAME | PRONUNCIATION |
|---|---|---|
| 1 | EDIT | "HENSHŪ" |
| 2 | WRITTEN REPORT | "HŌKOKU-SHO" |
| 3 | | |

FIG. 1D
(PRIOR ART)

| CHARACTER STRING | INFORMATION OBJECT ID |
|---|---|
| ゴミ箱 (GARBAGE BOX) | 1001 |
| LSI打ち合わせ資料 (MATERIALS FOR ARRANGEMENTS ON LSIs) | 1002 |
| ワープロ (WORDPROCESSOR) | 1003 |
| ソフト購入仕様書 (PURCHASE SPECIFICATIONS FOR SOFTWARE) | 1004 |
| ..... | ..... |

F I G. 3

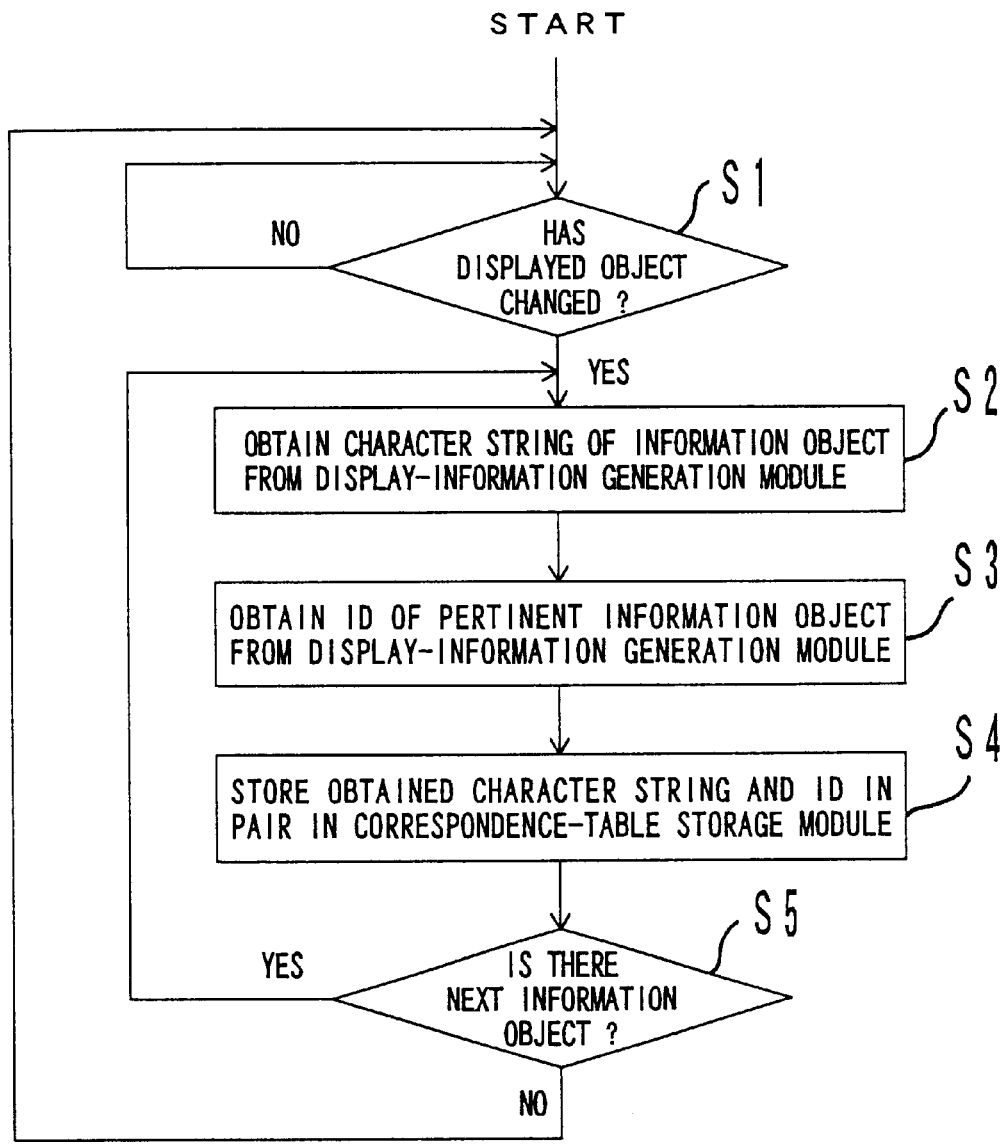
F I G. 4

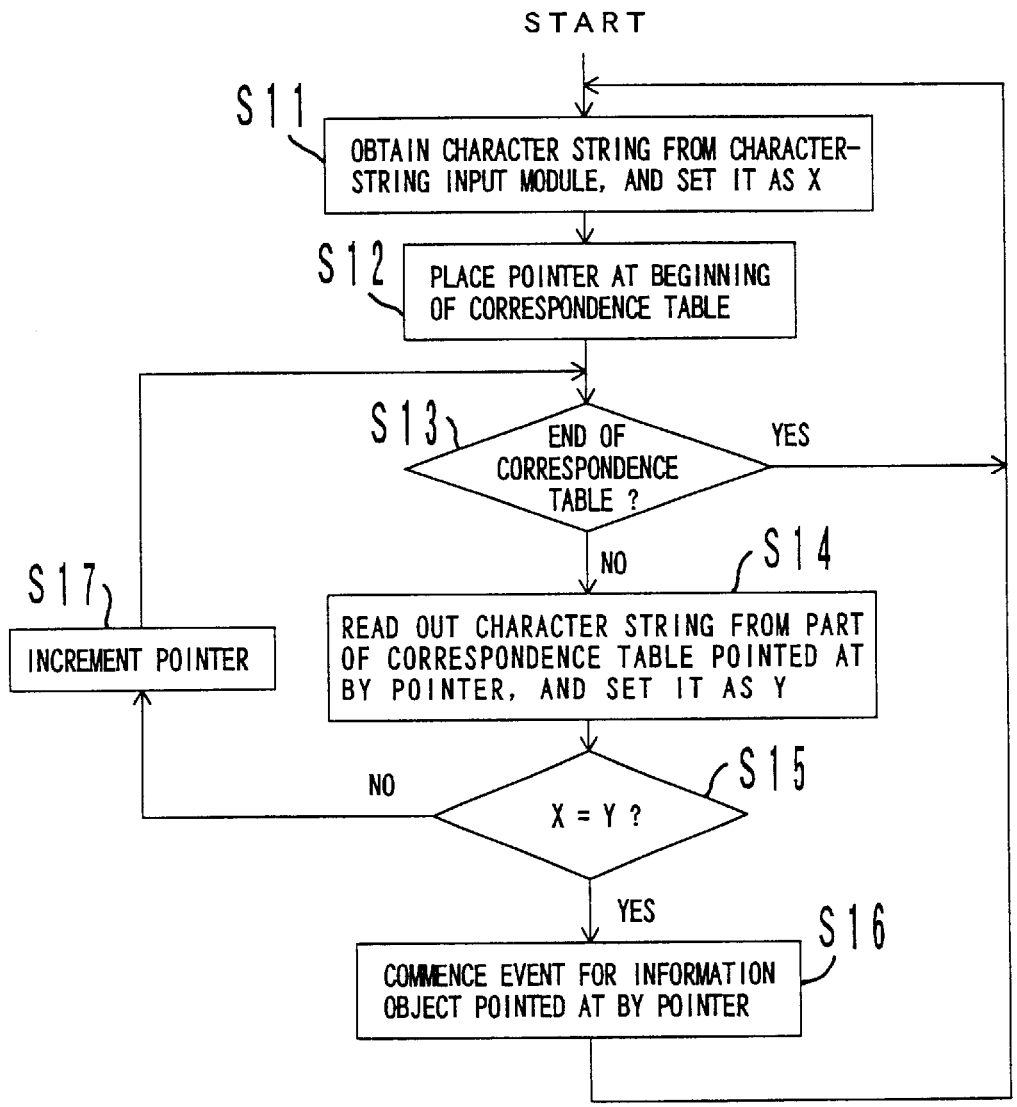
F I G. 5

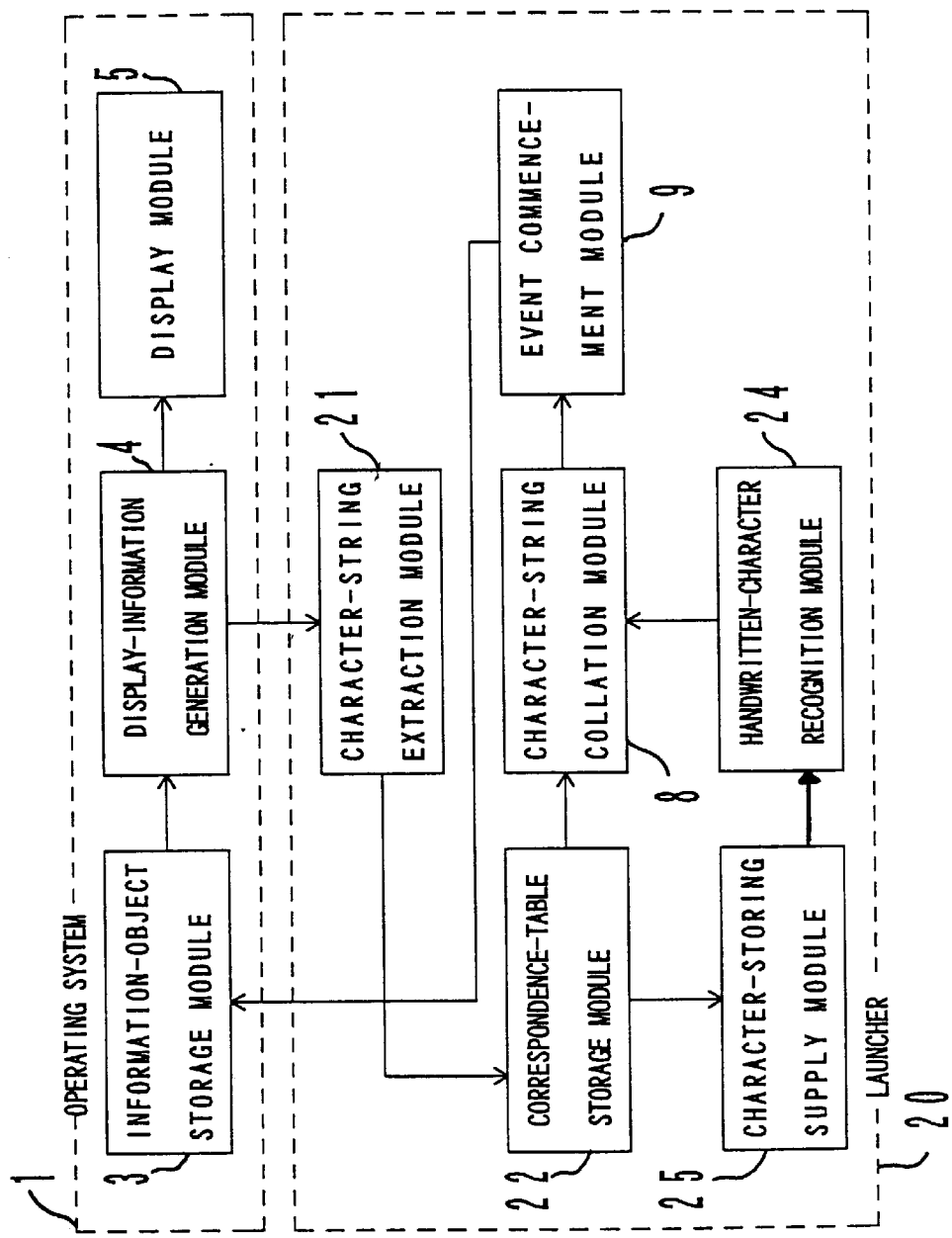
F I G. 9

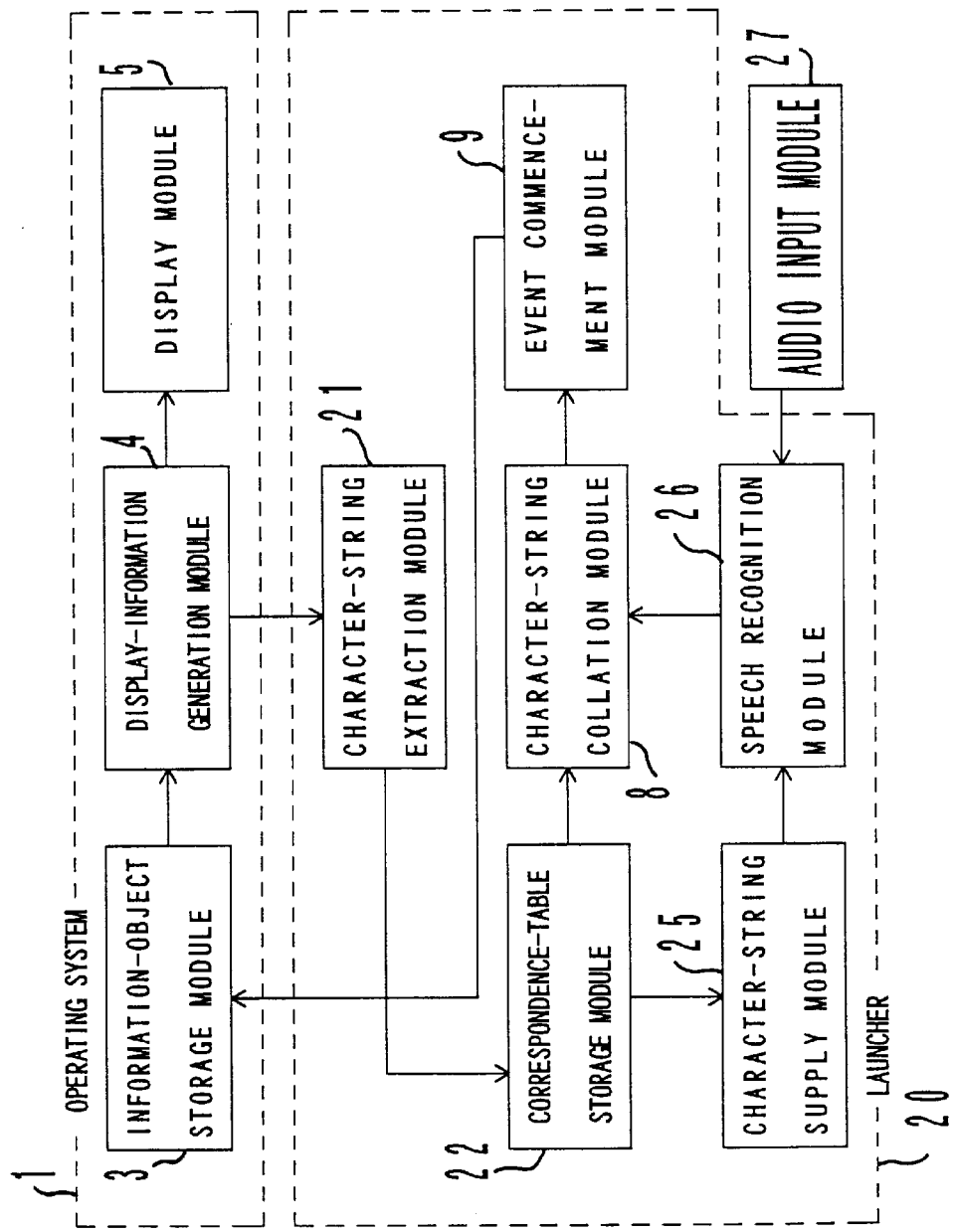
F I G. 11

FIG. 18

SPEECH SYNTHESIS — UNDER DELIVERY OF SPEECH SYNTHESIS — TIME

VOICE INPUT — VOICE INPUT — TIME

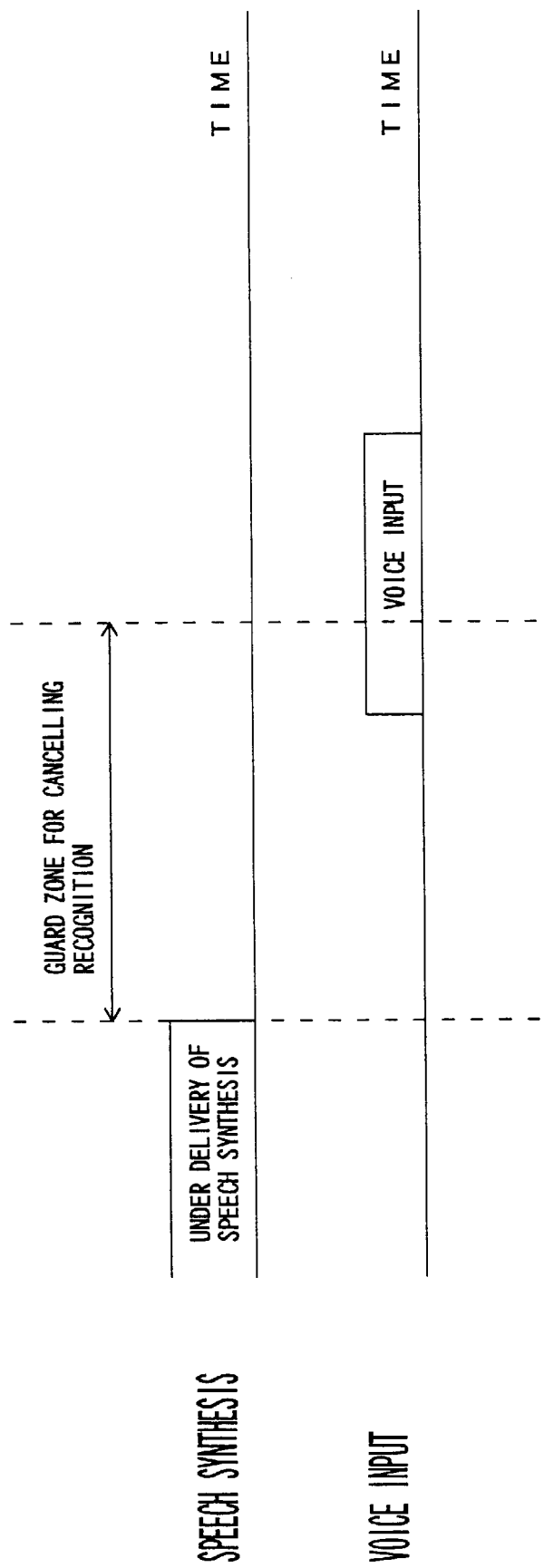
F I G. 19

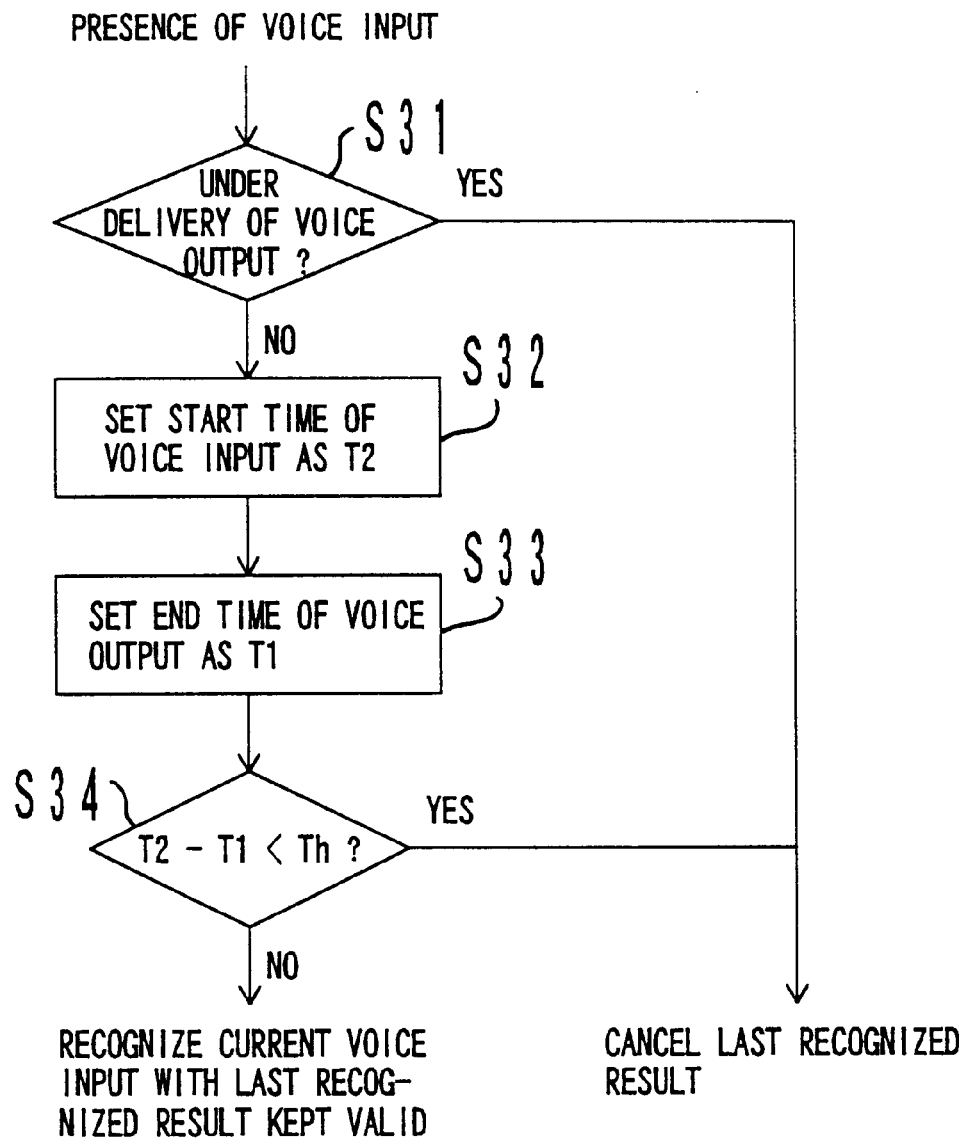
F I G. 2 1

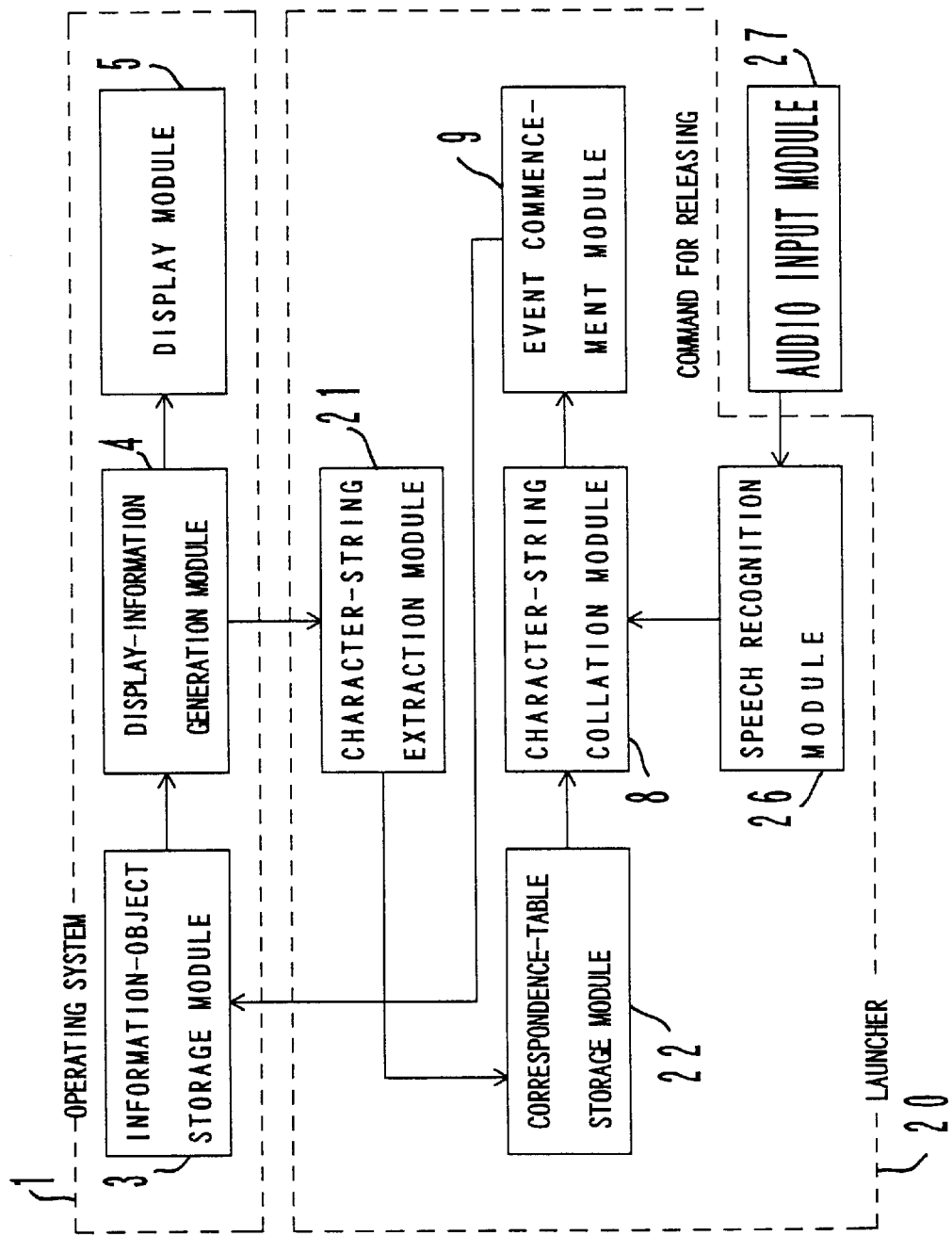
F I G. 2 4

INFORMATION-OBJECT DESIGNATION SYSTEM

BACKGROUND OF THE INVENTION

1. Field of the Invention

The present invention relates to information processing systems. More particularly, it relates to an object-oriented information processing system and consists in an information-object designation system which designates a stored information object for the purpose, e. g., of activating the information object.

2. Description of the Related Art

In an object-oriented information processing system, a small functional unit or module, for example, is arranged as an object in any desired processor, and a message is sent to the processor, thereby to activate the object and to execute a corresponding process.

FIG. 1A is a block diagram for explaining a prior-art example of an information-object designation system by which the object to be activated, for instance, is designated in such an object-oriented information processing system. Referring to the figure, a launcher 2 is the information-object designation system. Besides, an operating system 1 is that of the object-oriented information processing system, and only its constituents relevant to the designation of objects are shown here.

The operating system 1 includes an information-object storage module 3 which stores therein the names and identification numbers (IDs) of the information objects, the operations of the objects, the contents of the objects indicating a program, a text etc., and icons symbolic of the objects. Also included is a display-information generation module 4 by which a character string expressive of the name of at least one information object or such graphics information as the icon is generated as display information in order to display the information object. In addition, a display module 5 displays the display information generated by the display-information generation module 4.

The launcher 2 includes an information-object-identifier storage module 6 which stores therein the names, identification numbers, etc. of the information objects stored in the information-object storage module 3. Also included is a character-string input module 7 with which the user of the designation system enters any character string for designating the corresponding information object to-be-activated. In addition, a character-string collation module 8 collates the character string inputted from the character-string input module 7, with the character strings expressive of the names of the information objects as stored in the information-object-identifier storage module 6. Besides, an event commencement module 9 is disposed in order that, when the character-string collation module 8 has detected the match of the character strings, an event for the object having the specific character string as its name may be transferred to the information-object storage module 3.

FIG. 1B exemplifies the stored contents of the information-object storage module 3 which is included in the operating system 1 shown in FIG. 1A. The IDs of the information objects, the character strings serving as the names, the operations, the contents, and the icons are stored in correspondence with the respective objects.

FIG. 1C illustrates a display example of the icon which is symbolic of the corresponding object. The example is the icon of the object whose ID is "1" as shown in FIG. 1B, that is, the information object whose name is expressed by the character string of "EDIT".

FIG. 1D exemplifies the stored contents of the information-object-identifier storage module 6 which is included in the launcher 2 shown in FIG. 1A. As seen from FIG. 1D, the IDs of the objects, the character strings serving as the names, and the pronunciations of the character strings are stored in correspondence with the respective objects in the information-object-identifier storage module 6.

In the prior-art example of the launcher 2 explained with reference to FIG. 1A, the stored contents of the information-object-identifier storage module 6 are created by manually shifting those of the information-object storage module 3 which is included in the operating system 1. Therefore, the prior-art designation system has the problem that a long time is expended on the shifting operation. Another problem is that the character strings serving as the names of the objects need to be correctly pronounced and entered as indicated in FIG. 1D, so the shifting operation is troublesome.

Moreover, the user must keep in remembrance which of the objects stored in the information-object storage module 3 within the operating system 1 have been shifted to the side of the launcher 2. It is also necessary to indicate the shifted objects somewhere, for example, on a display device. These drawbacks are eliminated in such a way that the names and IDs of all the objects are shifted into the information-object-identifier storage module 6. This countermeasure, however, poses the problems that the storage module 6 requires a very large storage capacity, and that a long time is expended on the collating operation of the character-string collation module 8.

SUMMARY OF THE INVENTION

An object of the present invention is to provide an information-object designation system for automatically creating on a launcher side a correspondence table in which the character strings of the names of information objects stored in a memory on an operating system side and the identification numbers of the information objects are held in correspondence, thereby to dispense with a manual operation for shifting the stored contents of the memory to the launcher side.

An information-object designation system according to the present invention comprises a character-string comparison unit and an event commencement unit.

In the present invention, the character-string comparison unit compares two character strings; a character string expressive of the name of an information object stored in an information processing system, and a character string based on externally inputted information. When the character-string comparison unit has detected the match of the two character strings, the event commencement unit commences an event for the information object which bears a name expressed by the specific character string having matched.

BRIEF DESCRIPTION OF THE DRAWINGS

FIG. 1B is a table exemplifying the stored contents of an information-object storage module in the prior art as depicted in FIG. 1A;

FIG. 1D is a table exemplifying the stored contents of an information-object-identifier storage module which constitutes a launcher in the prior art and which is depicted in FIG. 1A;

FIG. 3 is a table exemplifying the stored contents of a correspondence-table storage module;

FIG. 4 is a flowchart showing a correspondence-table automatic generation process;

FIG. 5 is a flowchart showing the general process of a launcher in the first aspect of performance;

FIG. 9 is a block diagram showing an architecture in the fourth aspect of performance of an information-object designation system;

FIG. 11 is a block diagram showing an architecture in the sixth aspect of performance of an information-object designation system;

FIG. 18 is a timing chart for explaining timings (#1) in the case of cancelling a recognized result which has been produced by a speech recognition module;

FIG. 19 is a timing chart for explaining timings (#2) in the case of cancelling a recognized result which has been produced by the speech recognition module;

FIG. 21 is a flowchart showing a process which is executed by a recognition cancellation module;

FIG. 24 is a block diagram showing an architecture in the fifteenth aspect of performance of an information-object designation system;

DESCRIPTION OF THE PREFERRED EMBODIMENTS

Now, the aspects of performance of the present invention will be described in detail with reference to the drawings.

Figure 2A:
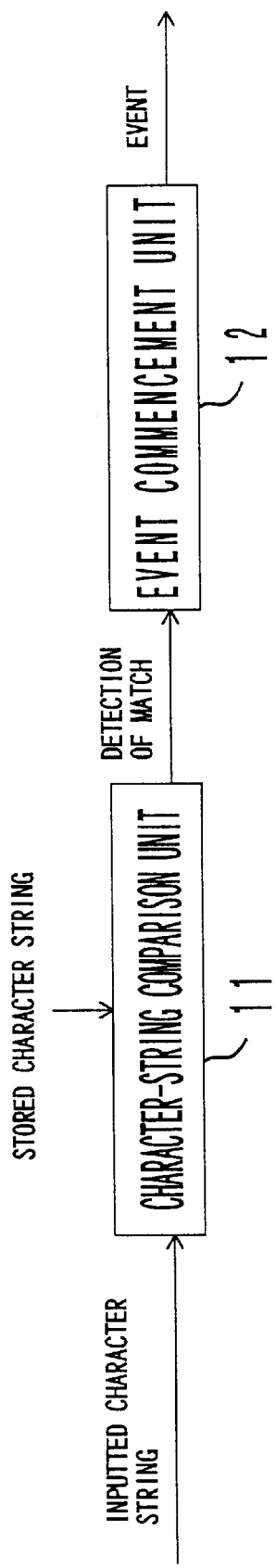
FIG. 2A is a block diagram showing the fundamental construction of the present invention.

FIG. 2A is a block diagram showing the fundamental construction of the present invention. It illustrates the fundamental architecture of an information-object designation system by which any of information objects stored in an information processing system is designated for the purpose of, for example, the activation thereof.

Referring to FIG. 2A, a character-string comparison unit 11 compares two character strings; a character string expressive of the name of any of the information objects stored in the information processing system, and a character string based on externally inputted information, for example, an input voice. An event commencement unit 12 commences an event for, for example, the activation of the information object having the name expressed by the specific character string, when the character-string comparison unit 11 has detected the match of the two character strings.

Figure 1A:
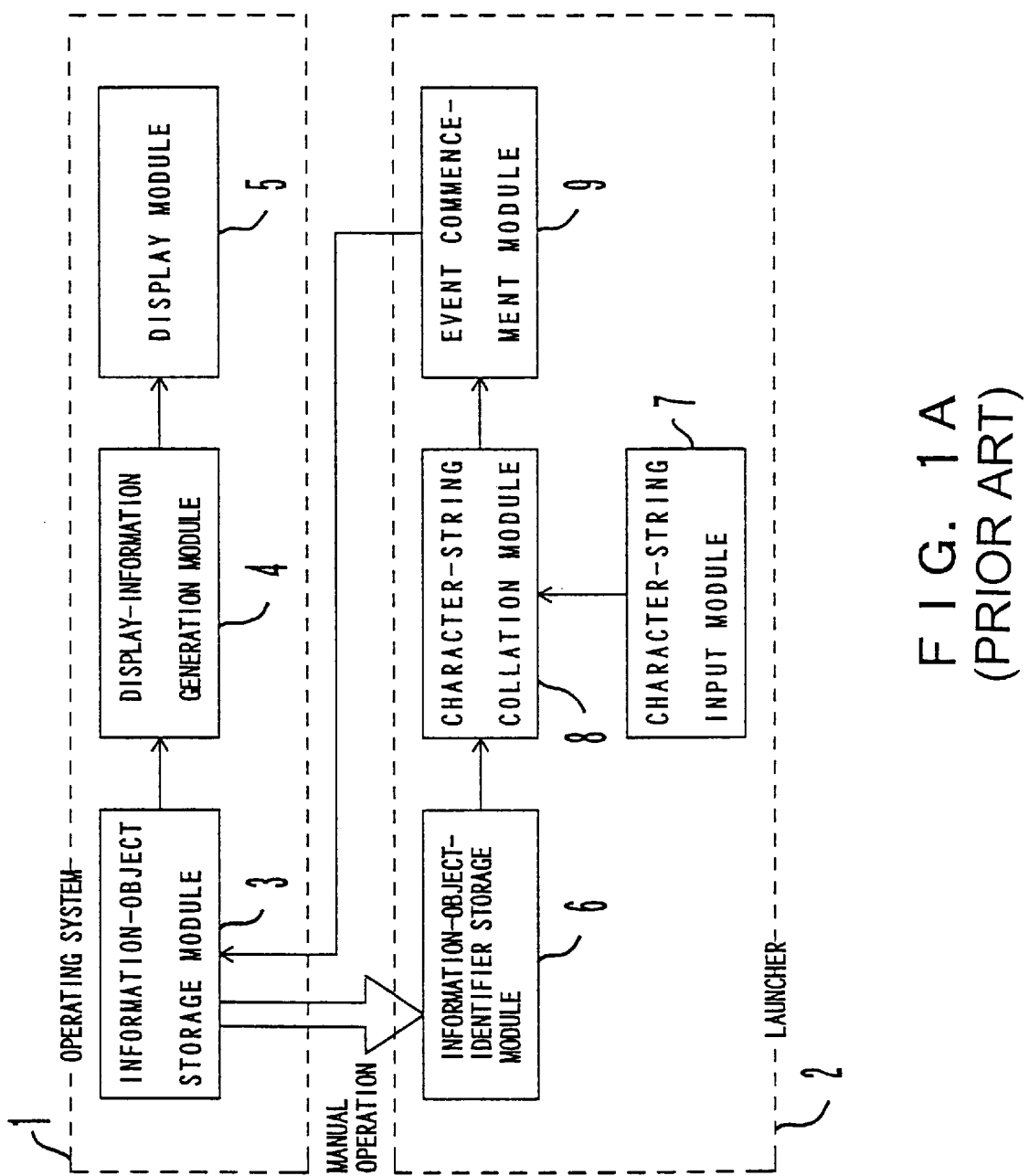
FIG. 1A is a block diagram showing the architecture of a prior-art example of an information-object designation system.
Figure 1C:
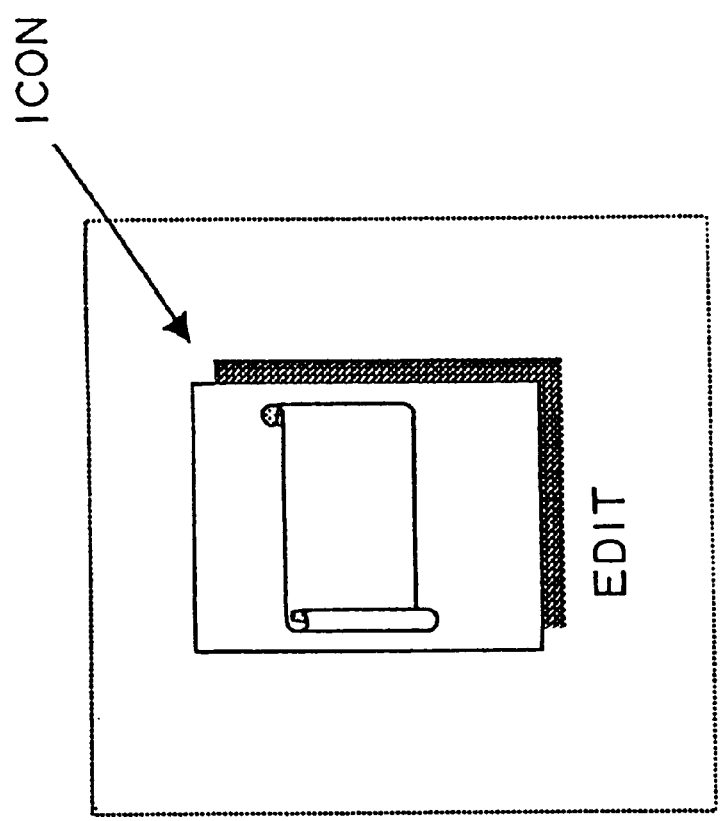
FIG. 1C is a sketch showing a display example of an icon which is symbolic of an information object in the prior art.

In the information processing system toward which the present invention is directed, as in the prior art illustrated in FIG. 1A by way of example, an operating system 1 includes therein an information-object storage module 3 which stores therein the names of the information objects, the operations thereof to be executed in correspondence with events, and the contents thereof, and a display module 5 which displays at least one of the information objects by the use of the character string expressive of the name of the pertinent information object. Such operations are also possible that the character-string comparison unit 11 shown in FIG. 2A employ the character string displayed by the display module 5, as the aforementioned character string expressive of the name of the information object stored in the information processing system, and that the event commencement unit 12 transfer the aforementioned event to the information-object storage module 3.

Further, the character string which is indicated on, for example, a display device, in other words, the character string which expresses the name of at least one of the information objects, is extracted from a display-information generation module 4 shown in FIG. 1A. The character string based on the information inputted by the user of the designation system is collated with the extracted character string. When the two character strings have been decided to match, the event is transferred to the information-object storage module 3, and the pertinent object is activated.

In the various aspects of performance of the present invention to be described below, the user can utilize a variety of expedients in order to designate any of the objects. The simplest expedient is to utilize a keyboard. In this case, the user can designate the name of the object in terms of a character string which contains a "kanji" (a Chinese character used in Japanese writing). Alternatively, handwritten characters or a voice can be utilized. In the case of utilizing the handwritten characters, they are converted into a character string by a handwritten-character recognition module, and in the case of utilizing the inputted voice, it is converted into a character string by a speech recognition module. The character string thus obtained is compared with the character string extracted from the display-information generation module 4.

In this manner, according to the present invention, the user can simply designate the information object which is to be activated by way of example, among the information objects which are respectively expressed by the displayed character strings.

Figure 2B:
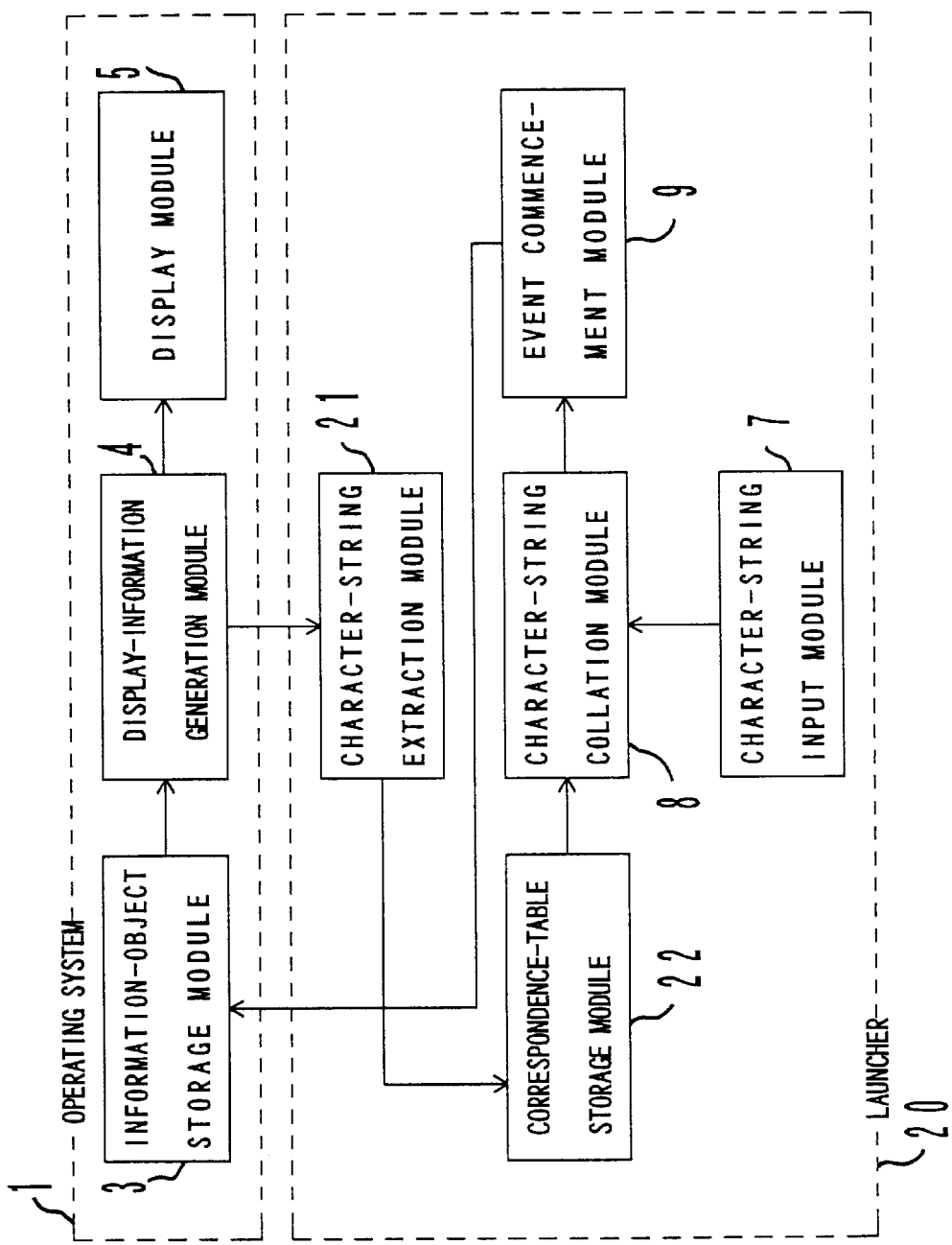
FIG. 2B is a block diagram showing an architecture in the first aspect of performance of an information-object designation system according to the present invention.

FIG. 2B is a block diagram showing an architecture in the first aspect of performance of an information-object designation system according to the present invention. As compared with the prior-art example illustrated in FIG. 1A, the designation system illustrated in FIG. 2B is basically different in the point that a character-string extraction module 21 and a correspondence-table storage module 22 are included in a launcher 20, instead of the information-object-identifier storage module 6 shown in FIG. 1A.

The character-string extraction module 21 extracts from a display-information generation module 4 respective character strings which express the names of information objects currently displayed by a display module 5, and it affords the extracted character strings to the correspondence-table storage module 22. This correspondence-table storage module 22 stores therein the correspondence between the character strings expressive of the names of the objects and the identification numbers (IDs) of the objects, and it affords the stored contents to a character-string collation module 8.

FIG. 3 exemplifies the stored contents of the correspondence-table storage module 22 shown in FIG. 2B. Referring to FIG. 3, the corresponding relations between the character strings expressive of the names of the information objects and the IDs serving as the identification numbers of the objects are tabulated for the respective objects.

In the architecture illustrated in FIG. 2B, the character-string extraction module 21 extracts the character string of, for example, "ゴミ箱 (Garbage box)" and the corresponding information object ID "1001" from the display-information generation module 4, and it stores the extracted character string and ID in the correspondence-table storage module 22. The character-string collation module 8 collates a character string inputted from a character-string input module 7, with the character string stored in the correspondence-table storage module 22. It searches for the ID of the matching character string, and reports the specific ID to an event commencement module 9. Then, the event commencement module 9 commences an event for the information object having the specific ID, in order to activate the object by way of example.

FIG. 4 is a flowchart showing a correspondence-table automatic generation process. Referring to the figure, when the process is started, whether or not an information object displayed by the display module 5 has changed is decided at step S1. Subject to the change, the character string of the information object is acquired from the display-information generation module 4 at step S2. In addition, the ID of the information object is acquired at step S3. The acquired character string and ID are stored in a pair in the correspondence-table storage module 4 at step S4. Whether the next information object is present or absent, is decided at step S5. In the presence of the next information object, the processing at step S2 and after is iterated. On the other hand, in the absence of the next information object, the automatic generation process returns into its initial state so as to wait the change of the displayed object. Step S1 is followed by the processing at step S2 only when the displayed object has changed. Insofar as the change does not occur, no processing is executed.

FIG. 5 is a flowchart showing the general process of the launcher 20 in the first aspect of performance illustrated in FIG. 2B. Referring to FIG. 5, when the process is started, a character string obtained from the character-string input module 7 is set as "X" at step S11. At next step S12, a pointer is placed at the beginning of the correspondence table as shown in FIG. 3. Whether or not the pointer has come to the end of the stored contents of the correspondence table, is decided at step S13. In a case where the pointer has not come to the end, a character string at a position pointed at by the pointer is read out and set as "Y" at step S14.

Whether or not the character strings "X" and "Y" match, is decided at step S15. Subject to the match, step S16 functions to commence an event for the information object pointed at by the pointer. Subsequently, the general process returns into its initial state where the next character string input is waited.

In contrast, on condition that the character strings "X" and "Y" do not match at step S15, the pointer is incremented at step S17, so as to iterate the processing at step S13 and after, that is, the processing of deciding whether or not the pointer has come to the end of the correspondence table, and after. Subject to the decision at step S13 that the pointer has come to the end of the correspondence table, the general process returns into its initial state where the next character string input is waited.

Figure 6:
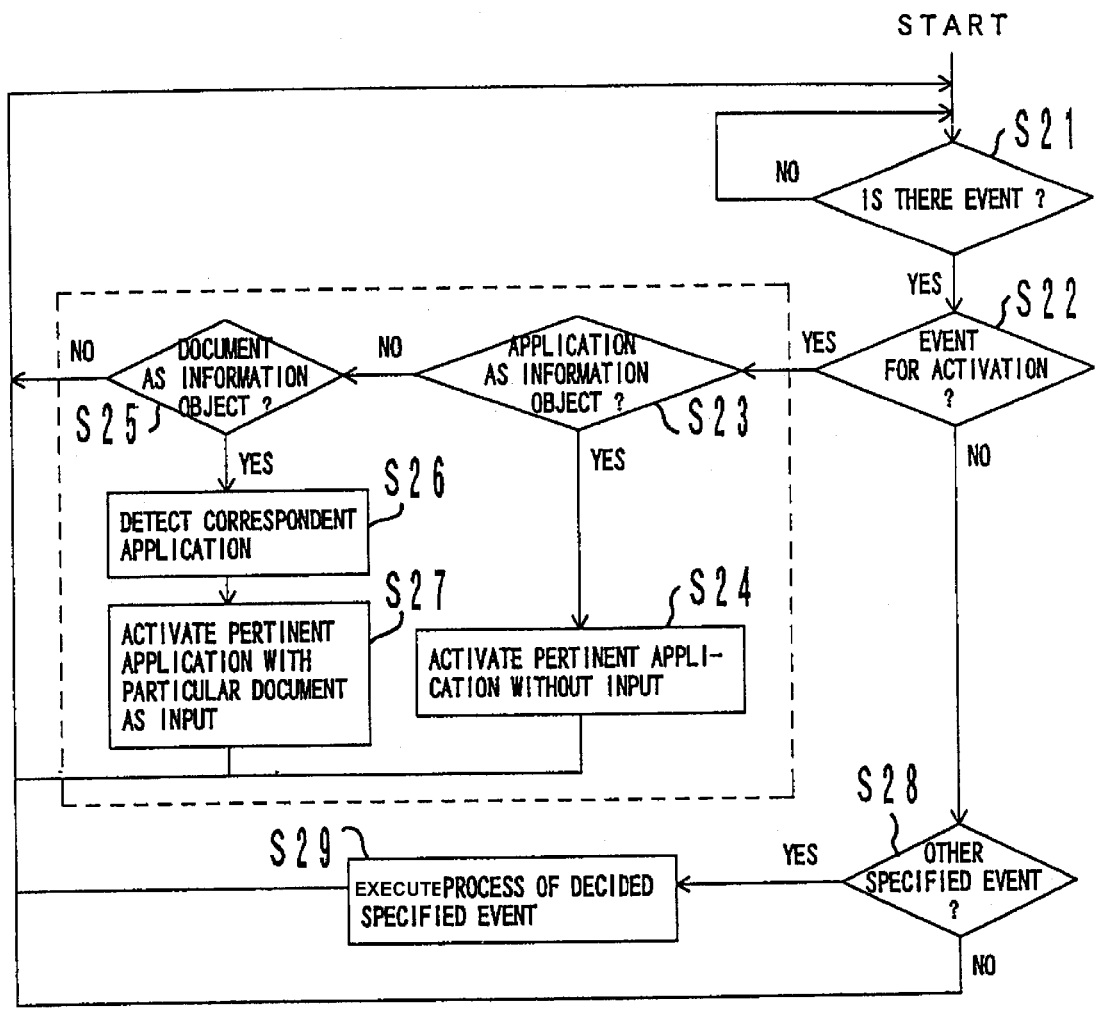
FIG. 6 is a general flowchart showing processing relevant to the present invention as proceeds on an operating system side.

FIG. 6 is a general flowchart showing processing relevant to the present invention as proceeds on the side of an operating system 1 in the first aspect of performance illustrated in FIG. 2B. Referring to FIG. 6, when the relevant process starts, whether or not an event has been transferred is decided at step S21. In the absence of the event, the relevant process falls into an event waiting state. Subject to the decision that the event has been transferred, whether or not the event is for activating an information object is decided at step S22. Subject to the activating event, whether or not the information object to be activated is an application is decided at step S23. In case of the application, this application is activated without any input at step S24. Then, the relevant process returns into its initial state where an event is waited.

Subject to the decision at step S23 that the information object to be activated is not the application, step S25 functions to decide whether or not the pertinent information object is a document. In case of the document, an application corresponding to the particular document is detected at step S26. At step S27, the pertinent application is activated with the particular document as an input. Thereafter, the relevant process returns into the event waiting state. Also in case of the decision at step S25 that the information object is not the document, the relevant process returns into the event waiting state.

Subject to the decision at step S22 that the transferred event is not for activating the object, step S28 functions to decide whether or not the event corresponds to any other specified process. The other specified process is, for example, a process in which the name of an event is called as will be explained later. When it has been decided that the event is for the other specified process, this process is executed at step S29, whereupon the relevant process returns into the event waiting state. On the other hand, when it has been decided that the event is not for the other specified process, the relevant process returns into the event waiting state without executing any process.

According to the first aspect of performance, a correspondence table which indicates the correspondence between character strings expressive of the names of information objects displayed on a display device or the like and the identification numbers of the information objects is automatically generated, and a character string entered from the side of a user is collated with each of the character strings stored in a correspondence-table storage module, whereby it is permitted to activate the object designated by the user. Thus, an operability for the designation of the information object can be enhanced. Accordingly, the present invention greatly contributes to more efficient processes in an object-oriented information processing system.

Figure 7:
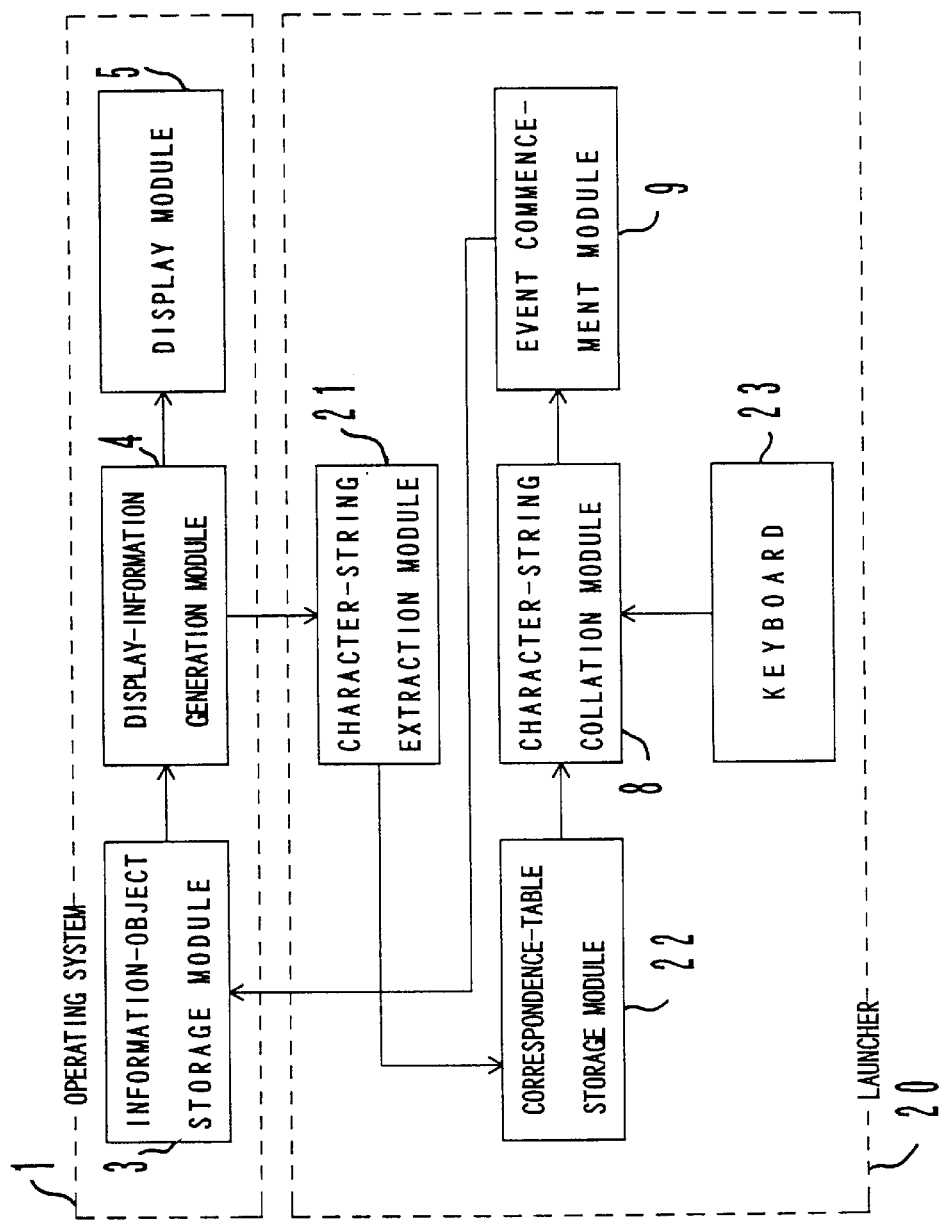
FIG. 7 is a block diagram showing an architecture in the second aspect of performance of an information-object designation system.

FIG. 7 is a block diagram showing an architecture in the second aspect of performance of an information-object designation system. As compared with the first aspect of performance illustrated in FIG. 2B, the second aspect of performance illustrated in FIG. 7 differs only in the point that the character-string input module 7 is constructed of a keyboard 23. A character string to be collated in the character-string collation module 8 is inputted from the keyboard 23.

According to the second aspect of performance a character string to be inputted can be simply entered from a keyboard.

Figure 8:
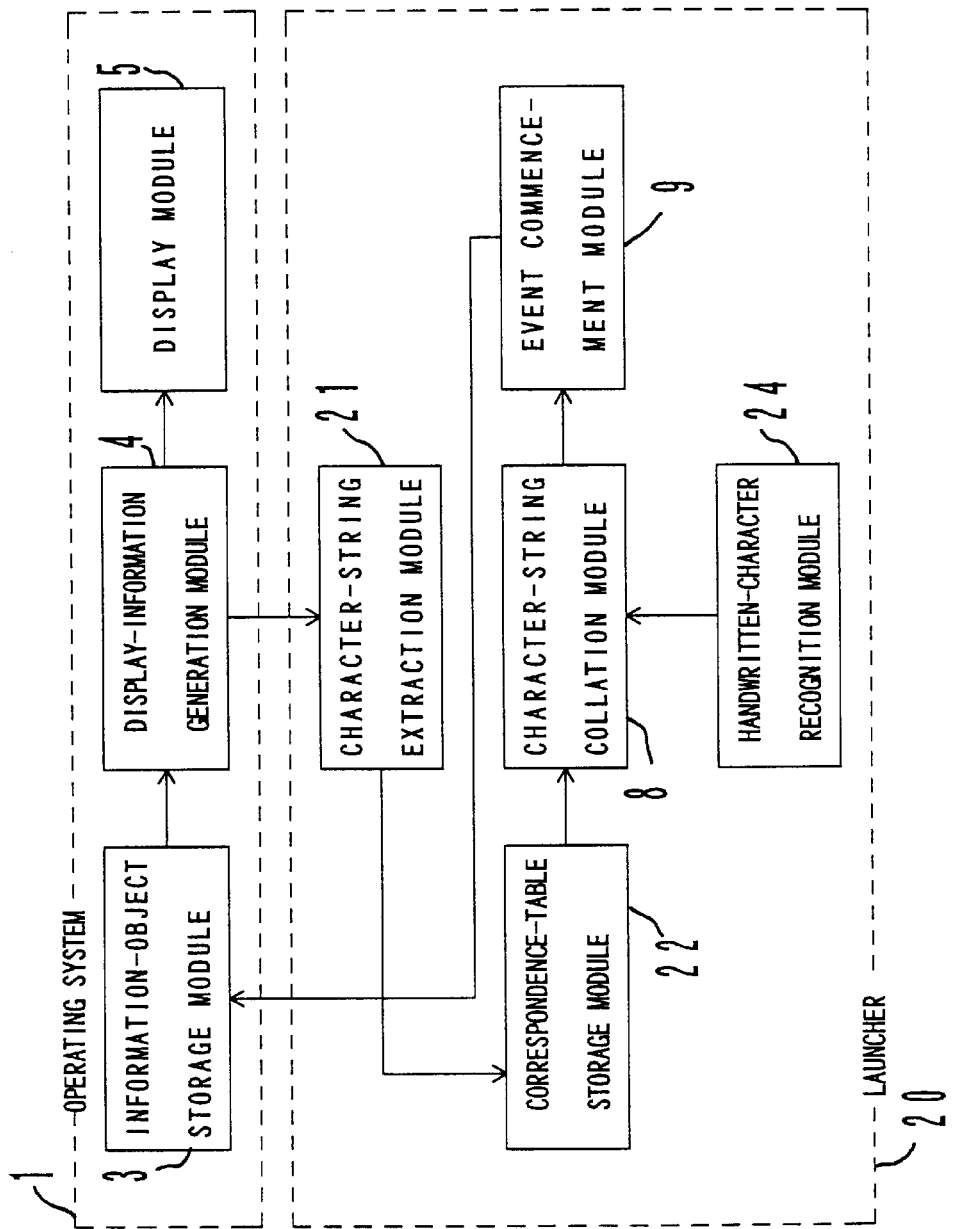
FIG. 8 is a block diagram showing an architecture in the third aspect of performance of an information-object designation system.

FIG. 8 is a block diagram showing an architecture in the third aspect of performance of an information-object designation system. As compared with the first aspect of performance illustrated in FIG. 2B, the third aspect of performance illustrated in FIG. 8 differs only in the point that the character-string input module 7 is constructed of a handwritten-character recognition module 24. A character string recognized by the handwritten-character recognition module 24 is collated in the character-string collation module 8.

According to the third aspect of performance, a character string to be inputted can be simply entered by handwriting.

FIG. 9 is a block diagram showing an architecture in the fourth aspect of performance of an information-object designation system. As compared with the third aspect of performance illustrated in FIG. 8, the fourth aspect of performance illustrated in FIG. 9 differs in the point of including a character-string supply module 25 which supplies a character string to-be-recognized to the handwritten-character recognition module 24. The character-string supply module 25 supplies only character strings expressive of the names of information objects stored in the correspondence-table storage module 22, as handwritten characters to-be-recognized. Concretely, regarding the example shown in FIG. 3, only the character strings which correspond respectively to the four information objects are given from the character-string supply module 25 to the handwritten-character recognition module 24 as the handwritten characters to-be-recognized.

The handwritten-character recognition module 24 recognizes characters inputted by the user, one by one. More specifically, even when the user intended to enter "″ゴミ箱 (Garbage box)" as an input, this input might be recognized as "″ゴ三箱″" by the handwritten-character recognition module 24. On this occasion, the recognized result is given to the character-string collation module 8 without any change, and it is decided in the character-string collation module 8 that the character strings "″ゴ三箱″" and "″ゴミ箱″" do not match.

In contrast, in the case where the handwritten characters to be recognized are limited to the four character strings exemplified in FIG. 3, the handwritten-character recognition module 24 can correctly recognize the character string "″ゴミ箱″" even when the user does not write a very good hand. In consequence, the character-string collation module 8 can correctly collate the character strings.

According to the fourth aspect of performance, when the number of subjects to be recognized is limited, the handwritten input character string can be efficiently collated with them.

Figure 10:
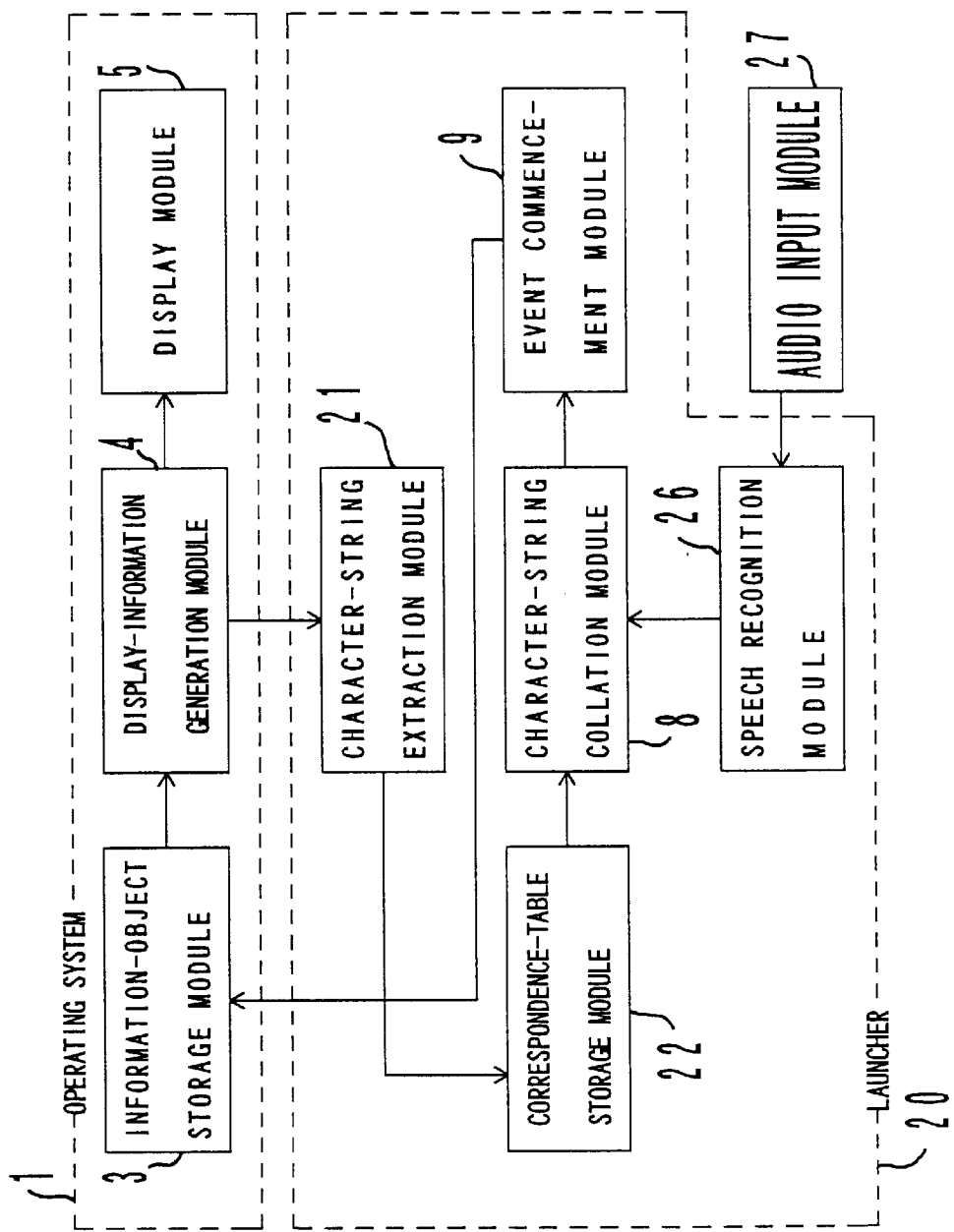
FIG. 10 is a block diagram showing an architecture in the fifth aspect of performance of an information-object designation system.

FIG. 10 is a block diagram showing an architecture in the fifth aspect of performance of an information-object designation system. As compared with the first aspect of performance illustrated in FIG. 2B, the fifth aspect of performance illustrated in FIG. 10 differs in the point that the character-string input module 7 is replaced with a speech recognition module 26 and an audio input module 27. Incidentally, the audio input module 27 is disposed outside the launcher 20.

The speech recognition module 26 shown in FIG. 10 recognizes a voice inputted from the audio input module 27, and affords a recognized result to the character-string collation module 8 as a character string. Here, the audio input module 27 is placed outside the launcher 20 in order that, if necessary, this audio input module 27 may be separated from the launcher 20 so as to be utilized by any other part of the information processing system.

As will be described later, in some aspects of performance of the present invention, a voice input is adopted as important means. Therefore, the voice input as a user interface will be explained. The user interface of a computer originally had the form of inputting commands on the basis of characters. With this interface, the user of the computer needed to keep all the commands in remembrance beforehand, and help screens etc. were prepared for a case where the user did not remember. A graphical user interface (GUI) appeared as the interface of the generation next the above form. Herein, a command can be inputted to a computer, for example, by clicking an icon with a mouse. Since the icon images the significance of the command, the computer has become very simply to use, especially for beginners.

On the other hand, information possessed by a voice is audio information. It is difficult to realize the function of pointing with the voice. By way of example, it is a misunderstanding to think that the pointing is effected with the voice of "″机の上 (Desk top)". The voice merely expresses the audio information of "″つくえのうえ (the pronunciation of "″机の上 (Desk top)")", and it does not have significant contents. The contents of the voice are grasped from the audio information by the language understanding capability of man. The utterance of the audio information is quite different from pointing at "″机の上″" with a mouse so as to give a command to a computer.

In order to introduce the audio interface into the computer having the graphical user interface (GUI), character information used in the GUI is indispensable. In case of the Japanese language, "kanjis (Chinese characters used in Japanese writing)" are often contained in the character information. Since the "kanjis" do not directly express their pronunciations, technology for converting the "kanjis" into their pronunciations becomes important.

According to the fifth aspect of performance, a character string to be inputted can be simply entered by a voice.

FIG. 11 is a block diagram showing an architecture in the sixth aspect of performance of an information-object designation system. As compared with the fifth aspect of performance illustrated in FIG. 10, the sixth aspect of performance illustrated in FIG. 11 differs in the point of including a character-string supply module 25 which supplies the speech recognition module 26 with character strings being subjects to-be-recognized. The operation of the character-string supply module 25 is the same as in the fourth aspect of performance illustrated in FIG. 9. This character-string supply module 25 affords the character strings expressive of the names of the information objects stored in the correspondence-table storage module 22, as the subjects to-be-recognized to the speech recognition module 26. Thus, the subjects to-be-recognized are limited.

According to the sixth aspect of performance, when the number of subjects to be recognized is limited, the voice input character string can be efficiently collated with them.

Figure 12:
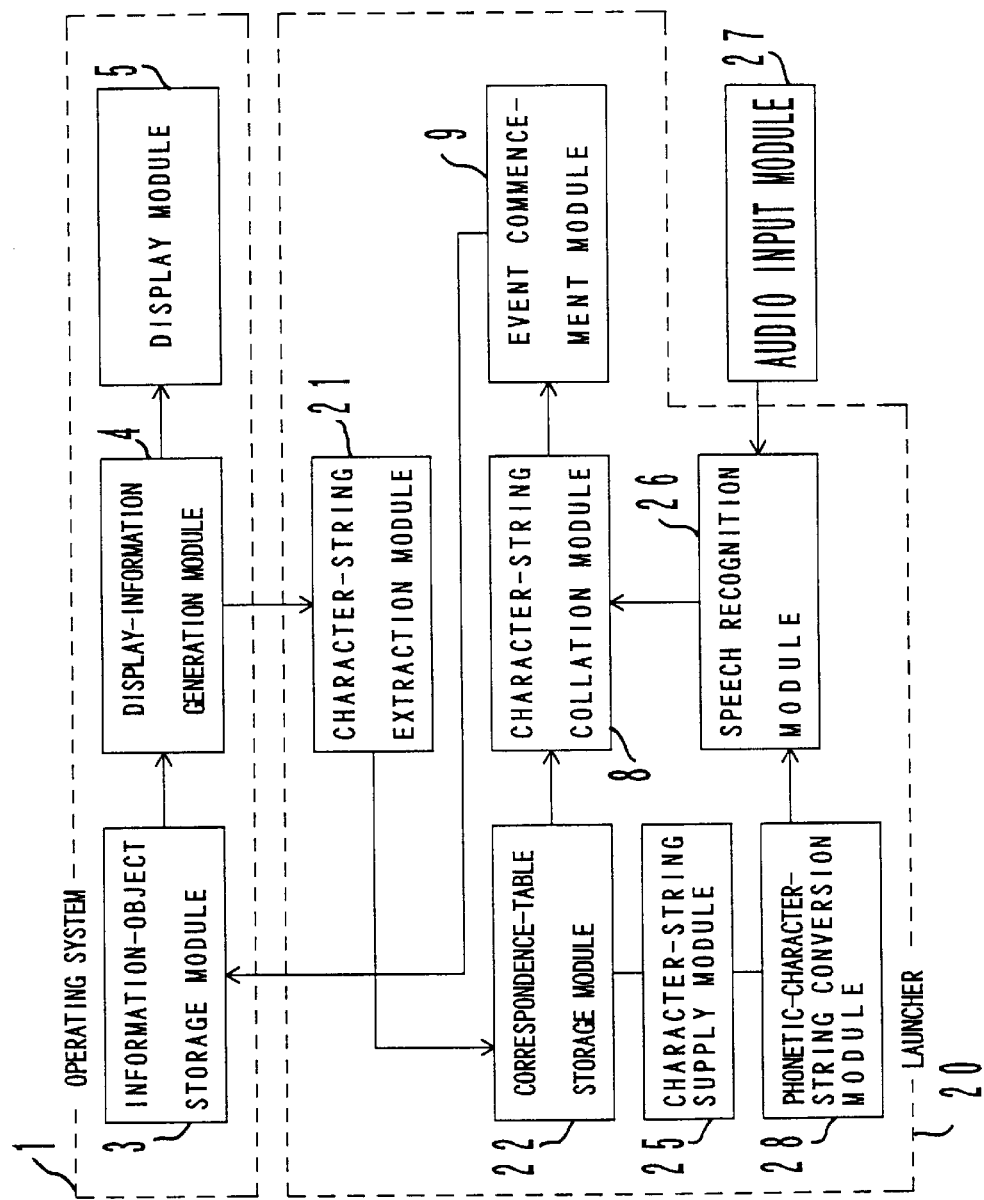
FIG. 12 is a block diagram showing an architecture in the seventh aspect of performance of an information-object designation system.

FIG. 12 is a block diagram showing an architecture in the seventh aspect of performance of an information-object designation system. As compared with the sixth aspect of performance illustrated in FIG. 11, the seventh aspect of performance illustrated in FIG. 12 differs in the point that a phonetic-character-string conversion module 28 is added between the character-string supply module 25 and the speech recognition module 26.

The phonetic-character-string conversion module 28 converts into phonetic character strings the character strings which are supplied from the character-string supply module 25, that is, the character strings which express the names of the information objects stored in the correspondence-table storage module 22. Concretely, the conversion module 28 converts the character string of, for example, "″ゴミ箱 (Garbage box)" into the phonetic character string of "″ゴミバコ″" being the pronunciation of this example. Subsequently, the conversion module 28 gives the speech recognition module 26 the pair which consists of the character string of the name and the pronunciation thereof and which has a structure ((ゴミ箱、ゴミバコ)). The speech recognition module 26 collates the voice inputted from the audio input module 27, for example, the voice of "″ゴミバコ″", with the phonetic character strings, and it outputs the character string of "″ゴミ箱″" as a recognized result. The character-string collation module 8 collates the character string of the recognized result with the character strings stored in the correspondence-table storage module 22 so as to search for the ID of the matching character string, and it reports the specific ID to the event commencement module 9. Then, the event commencement module 9 commences an event for the information object having the specific ID.

The reason why the phonetic character string is utilized for the speech recognition in the designation system of FIG. 12, is as explained below. The speech recognition module 26 needs to recognize the voice entered through the audio input module 27, exactly every phone. Concretely, in a case where the voice inputted as "″ゴミバコ (Gomibako)" has been erroneously recognized as "″ゴニバコ (Gonibako)", the recognized result can never be associated with the character string "″ゴミ箱 (pronounced "Gomibako")" of the name.

In contrast, with the designation system of FIG. 12, the phonetic character strings which are outputted by the phonetic-character-string conversion module 28 are limited to those of the information objects currently displayed. Assuming that the character strings of the information objects currently displayed consist only of the four indicated in FIG. 3, the speech recognition module 26 comes to judge which of the four character strings the inputted voice is close to. Therefore, the speech recognition module 26 is permitted to deliver the correct character string of "″ゴミ箱″" as the recognized result in response even to the voice input of "″ゴニバコ″".

According to the seventh aspect of performance, the phonetic character strings of the character strings being subjects to-be-recognized are conjointly used for the collation of the voice input character string, so that an efficient collation is realized.

Figure 13:
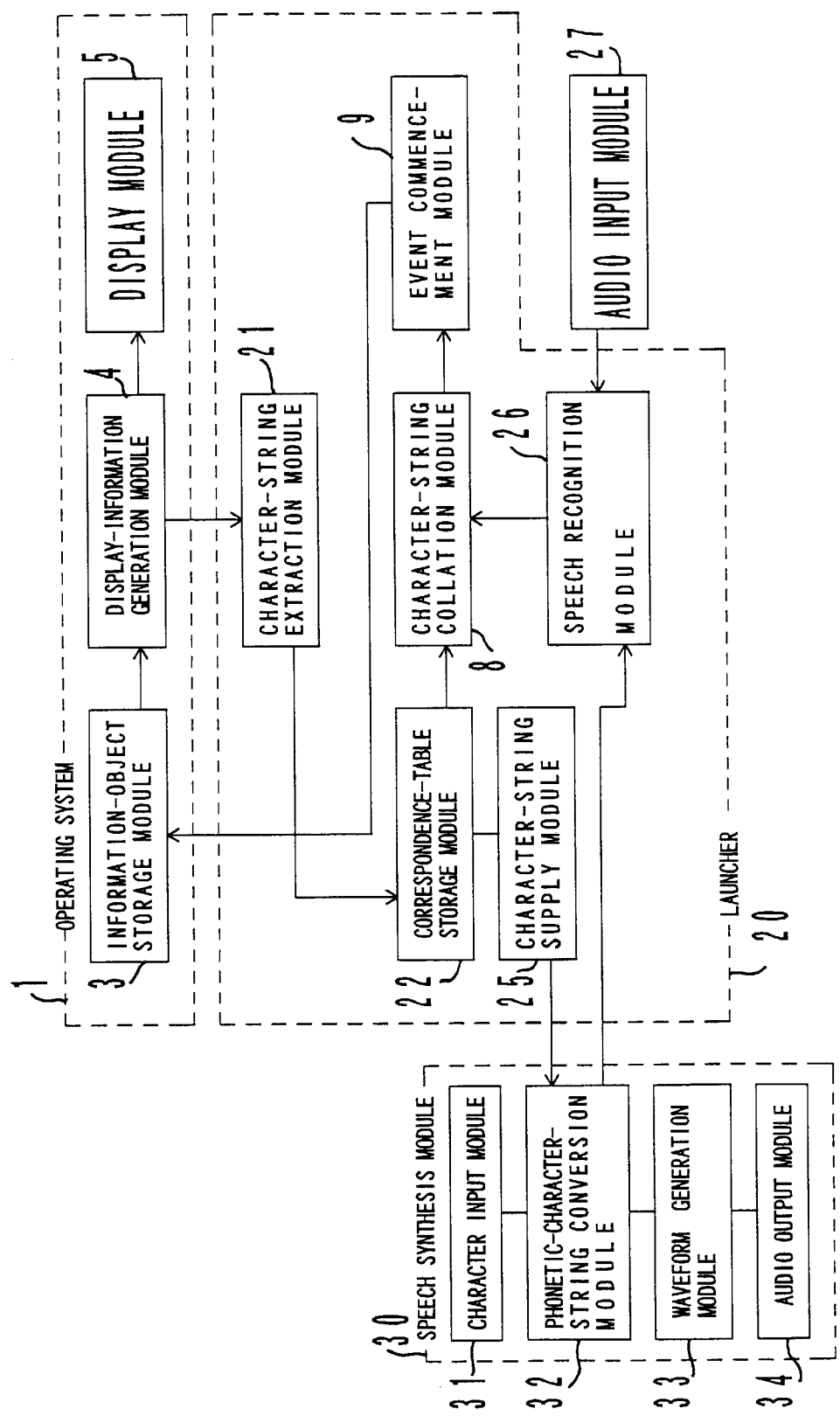
FIG. 13 is a block diagram showing an architecture in the eighth aspect of performance of an information-object designation system.

FIG. 13 is a block diagram showing an architecture in the eighth aspect of performance of an information-object designation system. As compared with the seventh aspect of performance illustrated in FIG. 12, the eighth aspect of performance illustrated in FIG. 13 differs only in the point that any phonetic-character-string conversion module is not disposed in the launcher 20, but that a phonetic-character-string conversion module 32 included in a speech synthesis module (or speech synthesizer) 30 constituting the information processing system is shared. The speech synthesis module 30 is used in common, not only for the designation of the information object in the present invention, but also for many other processes in the information processing system. This speech synthesis module 30 includes a character input module 31, the phonetic-character-string conversion module 32, a waveform generation module 33 and an audio output module 34.

According to the eighth aspect of performance, it is possible to employ phonetic character strings which have been obtained by an external function.

Figure 14:
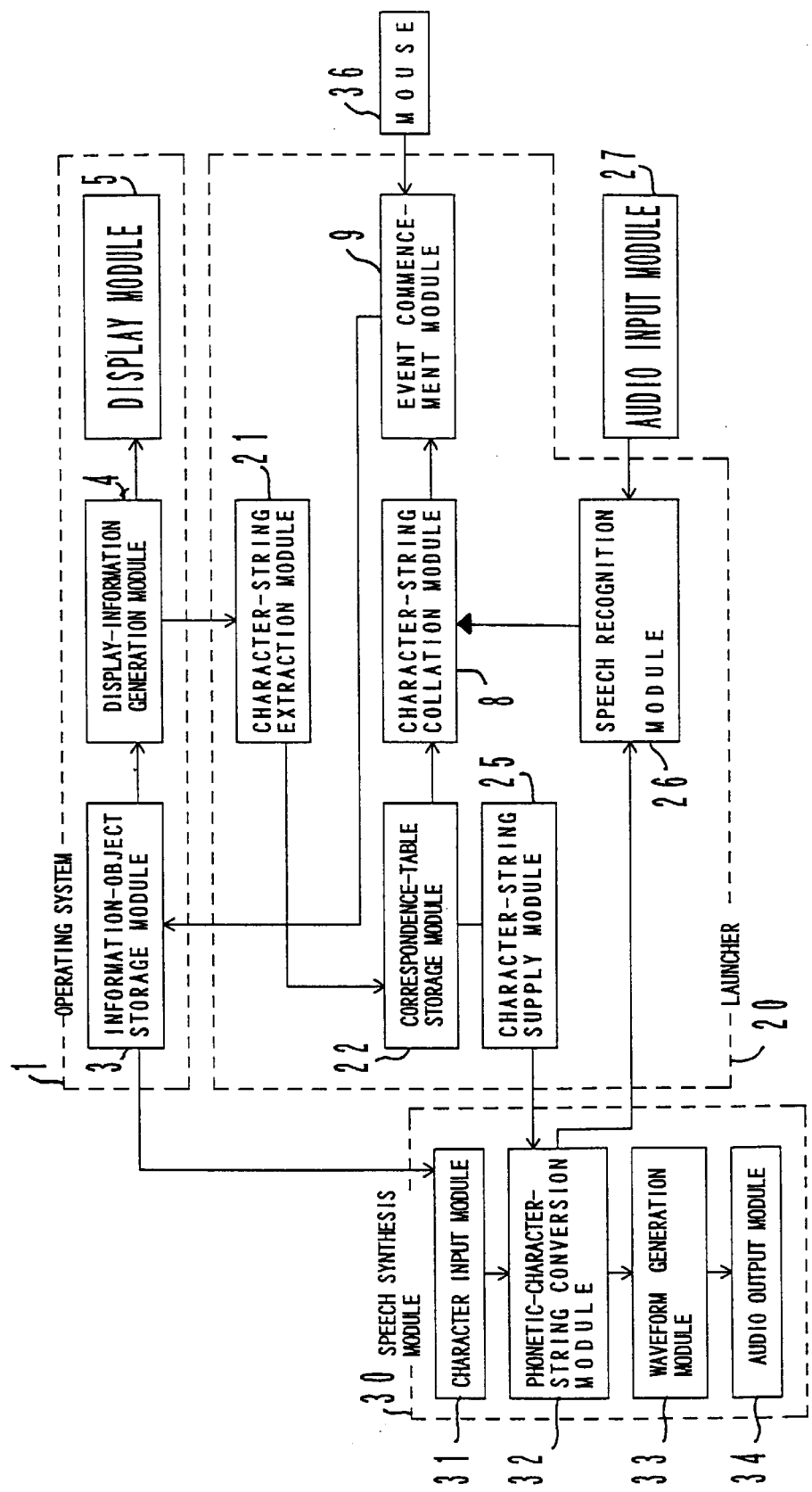
FIG. 14 is a block diagram showing an architecture in the ninth aspect of performance of an information-object designation system.

FIG. 14 is a block diagram showing an architecture in the ninth aspect of performance of an information-object designation system. As compared with the eighth aspect of performance illustrated in FIG. 13, the ninth aspect of performance illustrated in FIG. 14 differs in the following points: First, the event commencement module 9 is additionally provided with a mouse 36 with which the user designates, for example, a character string expressive of the name of an information object displayed on a display device or an icon symbolic of an information object, whereby the speech synthesis module 30 is commanded through, for example, a right-button double click to deliver its output of the name of the information object corresponding to the designated character string or icon. Secondly, a path which gives the character string of an information object for outputting the name of the designated object is extended from the information-object storage module 3 included in the operating system 1, to the character input module 31 included in the speech synthesis module 30.

Here in the ninth aspect of performance, when a character string being, for example, the recognized result of the speech recognition module 26 for a voice input entered by the user has been decided by the character-string collation module 8 to match with a character string stored in the correspondence-table storage module 22, an event for activating an information object whose name is the specific character string is transferred to the information-object storage module 3 by the event commencement module 9. As another process, an event which serves only for outputting the pronunciation of a character string displayed on the display device by way of example is transferred to the information-object storage module 3 by the event commencement module 9, and the specific pronunciation is synthesized and outputted by the speech synthesis module 30.

The character string expressive of the name of the information object whose pronunciation ought to be outputted, or the icon symbolic of the like information object, is designated by the mouse 36. The event which serves only for outputting the pronunciation of the character string expressive of the name of such an information object, is executed as the process of the decided specified event as shown at step S29 in FIG. 6.

Further, here in the ninth aspect of performance illustrated in FIG. 14, after the name of the information object designated with the mouse 36 has been outputted by the audio output module 34 included in the speech synthesis module 30, this audio output module 34 can be released or separated from the speech synthesis module 30 so as to be utilized by any other part of the information processing system. As a concrete example, in a case where the object to be activated by the event transferred from the event commencement module 9 is an object emitting sound, the audio output module 34 needs to be released and made usable for emitting the sound.

According to the ninth aspect of performance, the instruction of outputting the pronunciation of an event can be readily given with a mouse, and besides, an object to be activated is emitted as a synthesized voice, so that the object to be activated can be simply confirmed.

Figure 15:
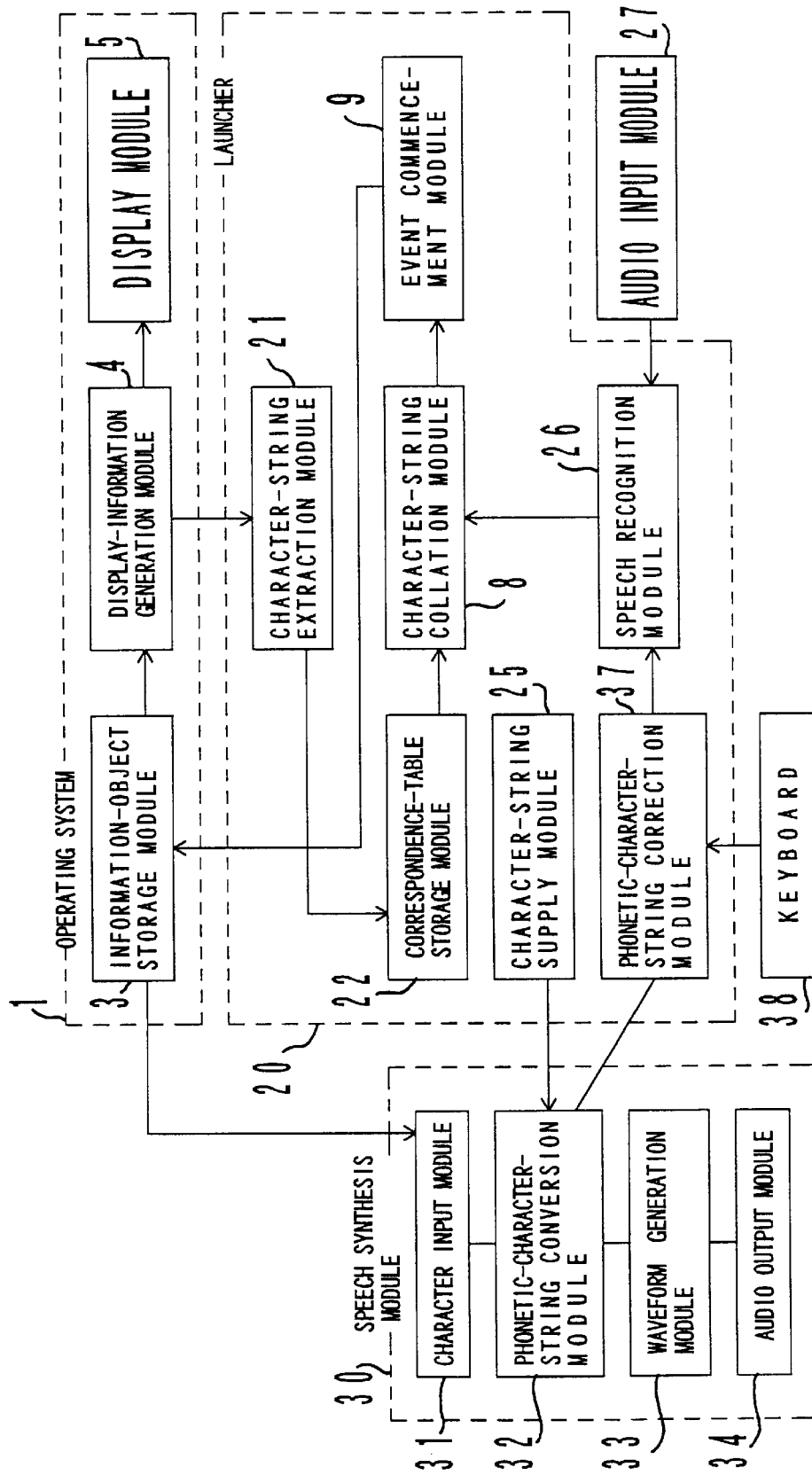
FIG. 15 is a block diagram showing an architecture in the tenth aspect of performance of an information-object designation system.

FIG. 15 is a block diagram showing an architecture in the tenth aspect of performance of an information-object designation system. As compared with, for example, the eighth aspect of performance illustrated in FIG. 13, the tenth aspect of performance illustrated in FIG. 15 differs in the points that a phonetic-character-string correction module 37 is interposed between the phonetic-character-string conversion module 32 and the speech recognition module 26, and that the phonetic-character-string correction module 37 is furnished with a keyboard 38 for giving the instruction of a correction. The phonetic-character-string correction module 37 is disposed in order that, when an error is contained in a phonetic character string converted by the phonetic-character-string conversion module 32, the user may correct the phonetic character string with the keyboard 38.

According to the tenth aspect of performance, a phonetic character string can be simply corrected.

Figure 16:
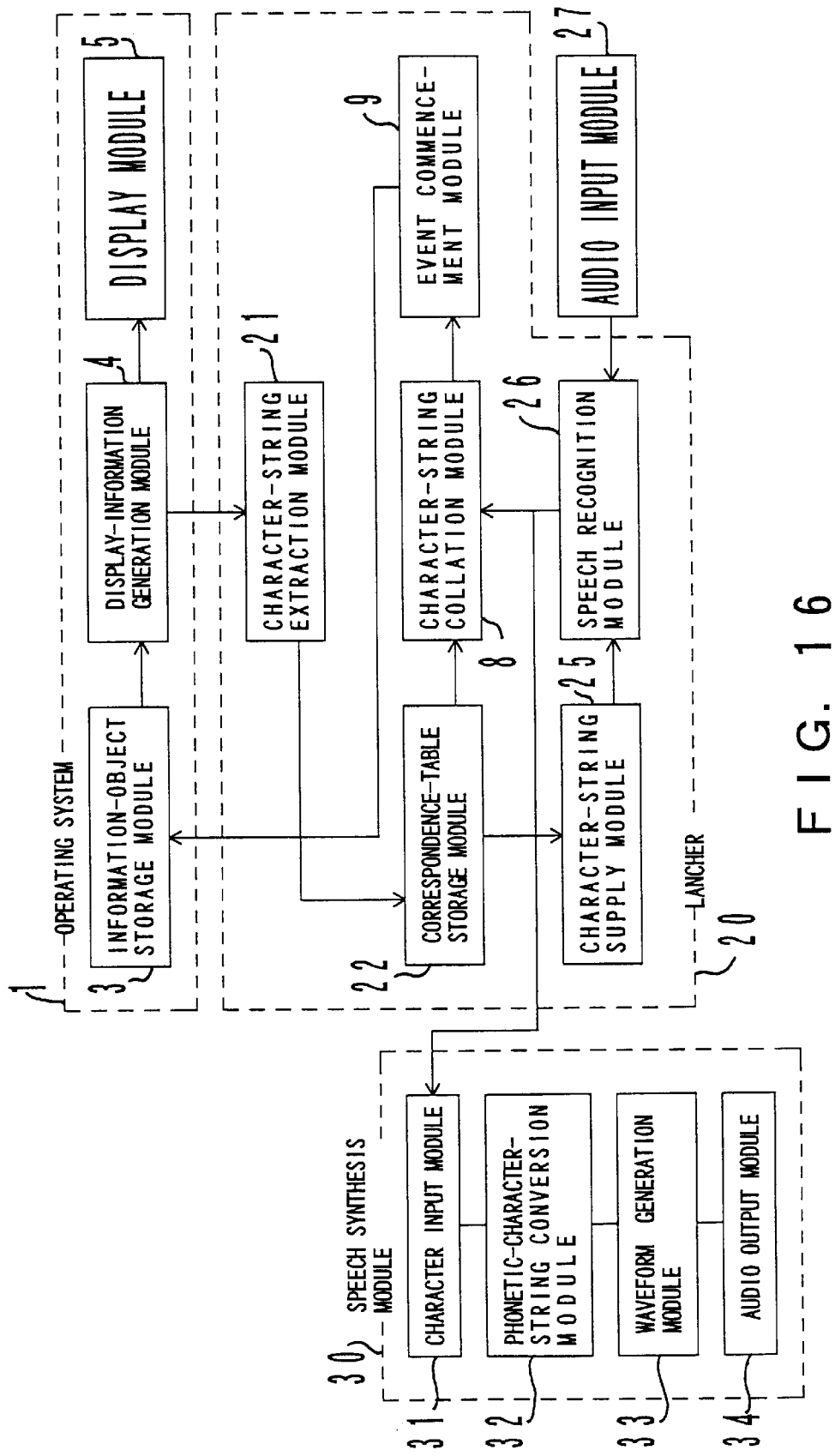
FIG. 16 is a block diagram showing an architecture in the eleventh aspect of performance of an information-object designation system.

FIG. 16 is a block diagram showing an architecture in the eleventh aspect of performance of an information-object designation system. As compared with, for example, the sixth aspect of performance illustrated in FIG. 11, the eleventh aspect of performance illustrated in FIG. 16 differs in the point that the recognized result of the speech recognition module 26 is inputted to a character input module 31 included in a speech synthesis module (or a speech synthesizer) 30 so as to be outputted as a recognized result by an audio output module 34 through a phonetic-character-string conversion module 32 as well as a waveform generation module 33.

According to the eleventh aspect of performance, since a recognized result is emitted as a synthesized voice, it can be simply confirmed.

Figure 17:
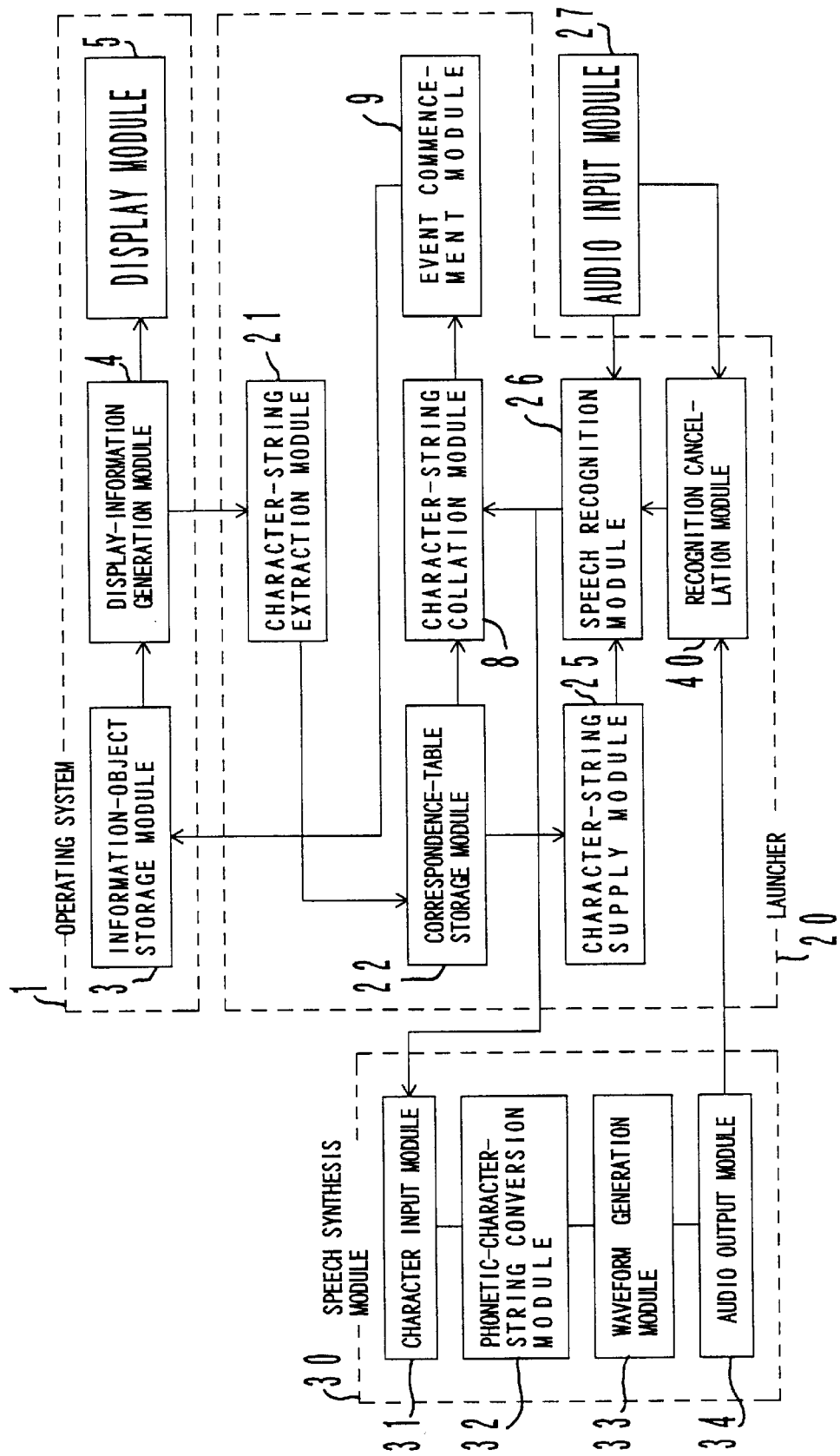
FIG. 17 is a block diagram showing an architecture in the twelfth aspect of performance of an information-object designation system.

FIG. 17 is a block diagram showing an architecture in the twelfth aspect of performance of an information-object designation system. As compared with the eleventh aspect of performance illustrated in FIG. 16, the twelfth aspect of performance illustrated in FIG. 17 differs in the point that the speech recognition module 26 is furnished with a recognition cancellation module 40 for giving the instruction of cancelling a recognized result. A cancellation process which is executed by the recognition cancellation module 40, will now be explained with reference to FIGS. 18 through 21.

FIGS. 18 and 19 are timing charts each serving to explain timings in the case of cancelling the recognized result which has been produced by the speech recognition module 26. FIG. 18 illustrates a situation where the input of a voice through the audio input module 27 has been detected while the speech recognition result is being outputted as a synthesized voice by the audio output module 34. In such a situation, the recognized result of the voice is canceled by regarding the voice input as a voice which implies that the output of the recognized result delivered from the audio output module 34 is incorrect, for example, as a new voice which has been inputted by the user.

FIG. 19 illustrates a situation where a voice input has been detected within a predetermined time period since the output of the recognized result was delivered as a synthesized voice from the audio output module 34. Also in such a situation, the speech recognition result is canceled. The predetermined time period is indicated as a "guard zone for cancelling the recognition" in FIG. 19.

Figure 20:
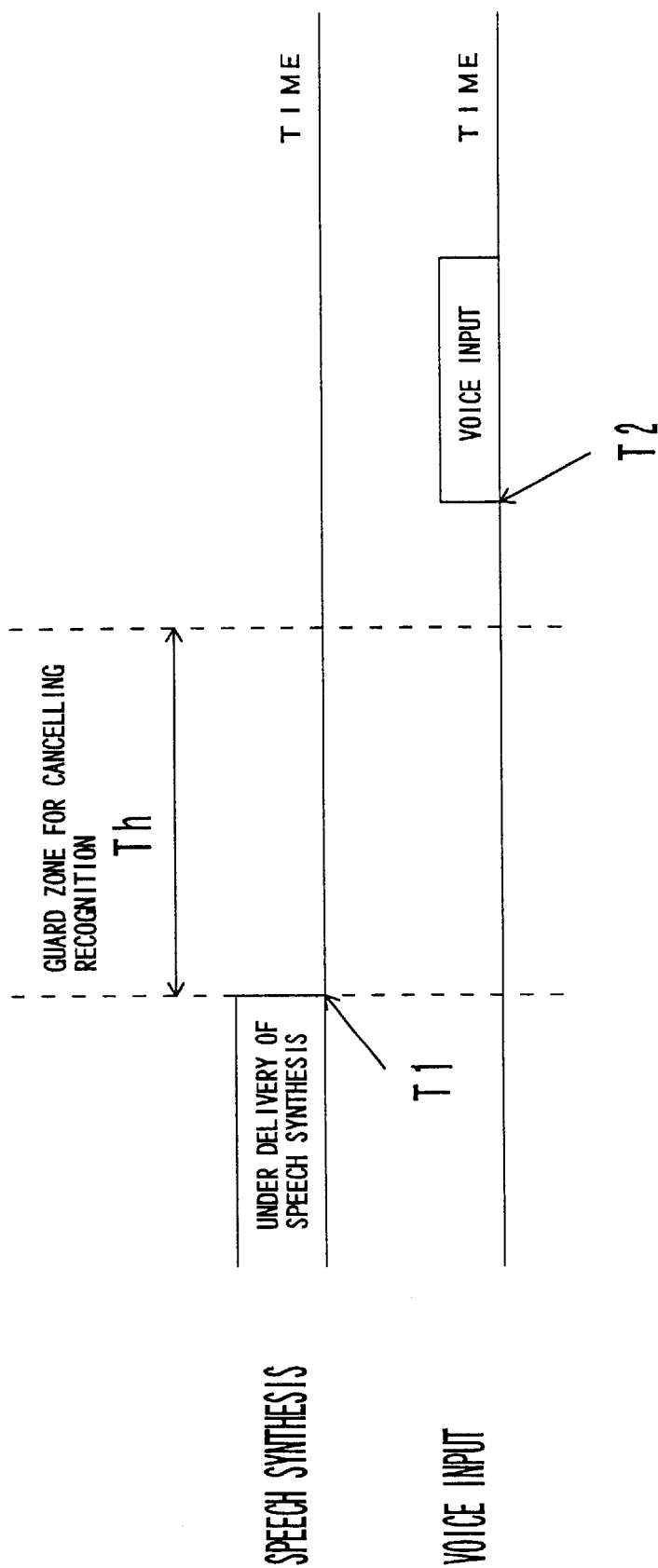
FIG. 20 is a timing chart for explaining timings in the case of not cancelling a speech recognition result.

FIG. 20 illustrates timings in the case where a speech recognition result is not canceled. The case shown in the figure is a situation where a time period lapsing between the point of time T1 at which the output of the synthesized voice of the recognized result ended, and the point of time T2, at which the input of a new voice was started, is longer than a recognition cancelling guard zone Th. In such a situation, the recognized result of the voice is not canceled.

FIG. 21 is a flowchart showing the process which is executed by the recognition cancellation module 40. Referring to the figure, the process is started when a voice input through the audio input module 27 has been detected. At step S31, whether or not the output of a synthesized voice is being delivered is decided. In a case where the voice output is not being delivered, the start time of the voice input is set as T2 at step S32. Further, the end time of the synthesized voice output is set as T1 at step S33. Step S34 functions to decide whether or not the difference between the times T2 and T1 is less than the value Th of a recognition cancelling guard zone. When the difference is equal to or greater than the value Th, the last recognized result is judged valid and is not canceled, and the new input voice is recognized by the speech recognition module 26. In contrast, the last recognized result is canceled when it has been decided at step S31 that the voice output is being delivered, or when it has been decided at step S34 that the difference between the times T2 and T1 is less than the value Th.

According to the twelfth aspect of performance, since an input character string subjected to speech recognition can be canceled, a more precise speech recognition result can be obtained.

Figure 22:
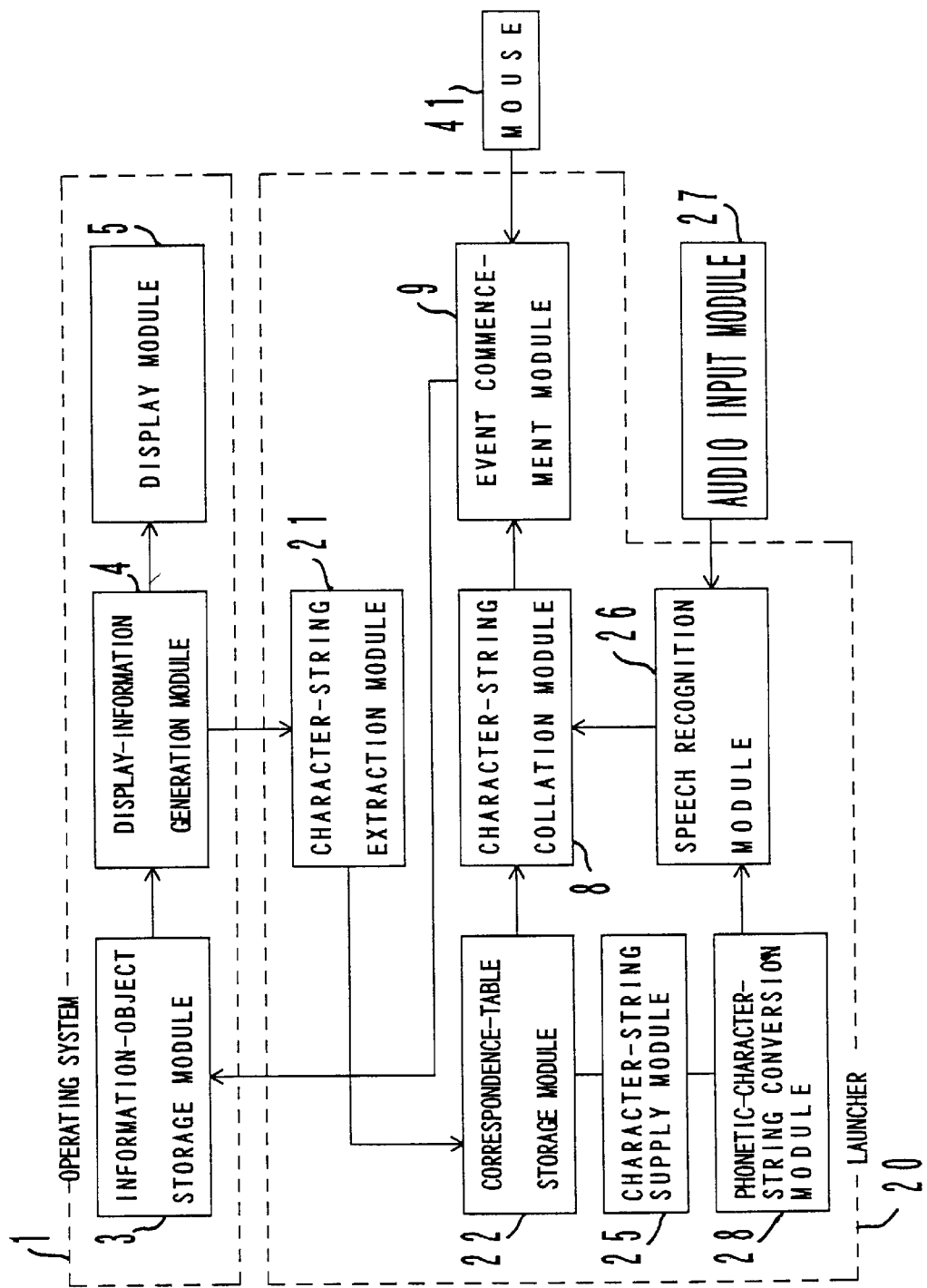
FIG. 22 is a block diagram showing an architecture in the thirteenth aspect of performance of an information-object designation system.

FIG. 22 is a block diagram showing an architecture in the thirteenth aspect of performance of an information-object designation system. As compared with, for example, the seventh aspect of performance illustrated in FIG. 12, the thirteenth aspect of performance illustrated in FIG. 22 differs in the point that a mouse 41 for directly instructing the event commencement module 9 to commence an event is connected-to this module 9. The mouse 41 is not identical to the mouse 36 shown in FIG. 14 as causes the event commencement module 9 to commence the event for outputting the pronunciation of the character string of the displayed information object, but it causes the event commencement module 9 to transfer the event therefrom to the information-object storage module 3, this event serving to activate an information object whose name is expressed by a displayed character string. More specifically, here in the thirteenth aspect of performance, even in a case where the match between a character string entered as a voice input and a character string stored in the correspondence-table storage module 22 has not been decided by the character-string collation module 8, the activation of the designated information object is permitted in such a way that the user designates the character string, the icon or the like corresponding to the pertinent object, with the mouse 41 and by, for example, the double click of the left button thereof.

According to the thirteenth aspect of performance, when an event to be commenced is designated with a mouse, it can be simply activated.

Figure 23:
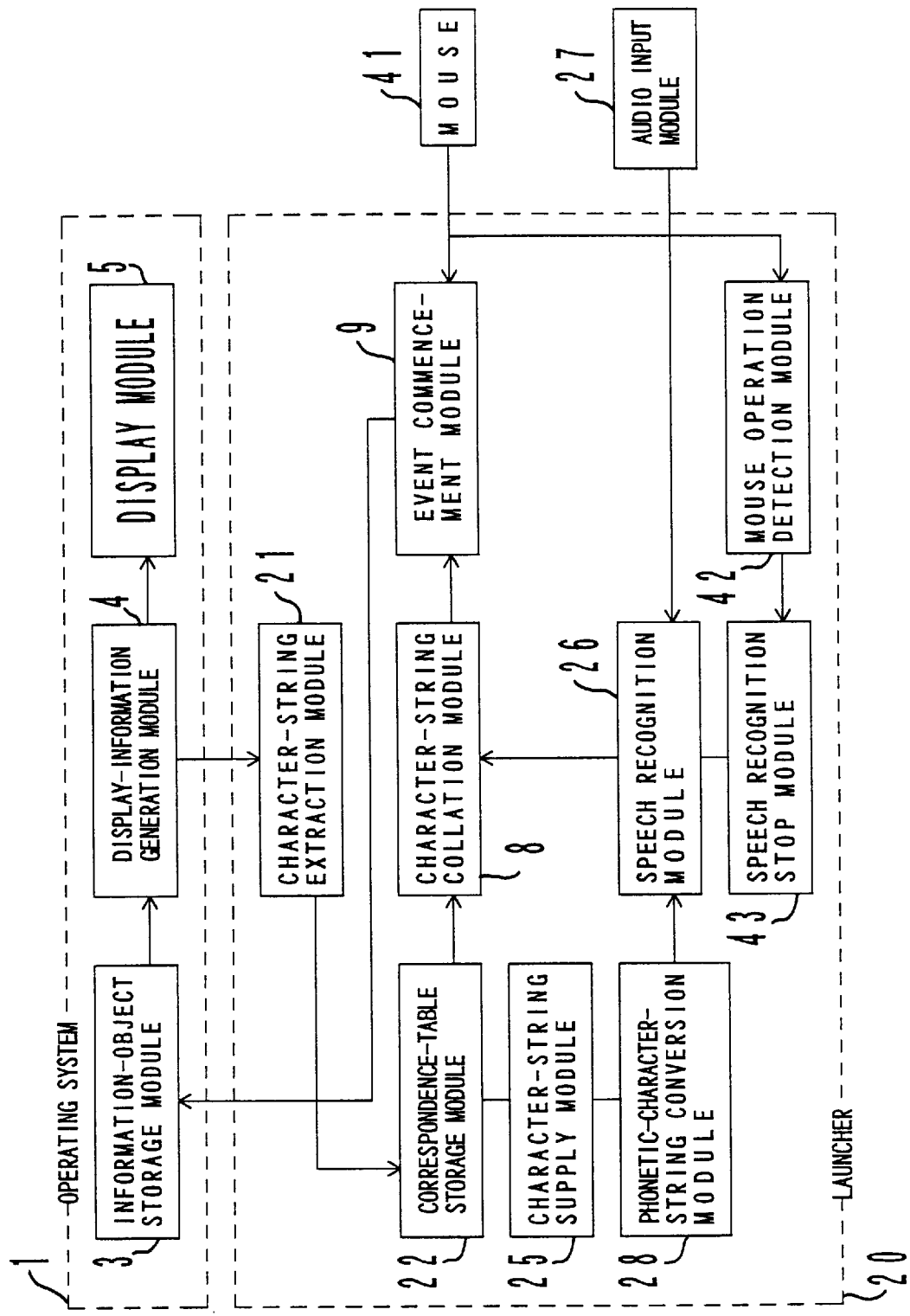
FIG. 23 is a block diagram showing an architecture in the fourteenth aspect of performance of an information-object designation system.

FIG. 23 is a block diagram showing an architecture in the fourteenth aspect of performance of an information-object designation system. As compared with the thirteenth aspect of performance illustrated in FIG. 22, the fourteenth aspect of performance illustrated in FIG. 23 differs in the point of including a mouse-operation detection module 42 which detects the operation of the mouse 41, and a speech-recognition stop module 43 which stops the speech recognition operation of the speech recognition module 26 when the mouse-operation detection module 42 has detected the input operation with the mouse 41.

Here in the fourteenth aspect of performance illustrated in FIG. 23, when an information object to be directly activated by the mouse 41 is designated so as to afford the designation to the event commencement module 9, the processing of invalidating the recognized result of a voice input is executed even in the presence of the voice input. In other words, when the proceeding of the input operation with the mouse 41 has been decided by the mouse-operation detection module 42, the speech recognition operation of the speech recognition module 26 is stopped by the speech-recognition stop module 43.

According to the fourteenth aspect of performance, the speech recognition operation can be simply stopped by using the mouse.

FIG. 24 is a block diagram showing an architecture in the fifteenth aspect of performance of an information-object designation system. Although the architecture is similar to that of the fifth aspect of performance illustrated in FIG. 10, it differs in the point that the command of releasing or separating the audio input module 27 is given to the speech recognition module 26 after an event has been transferred to the information-object storage module 3 by the event commencement module 9. The reason why the audio input module 27 is released in this manner, is the same as in the release of the audio output module 34 shown in FIG. 14.

Figure 25:
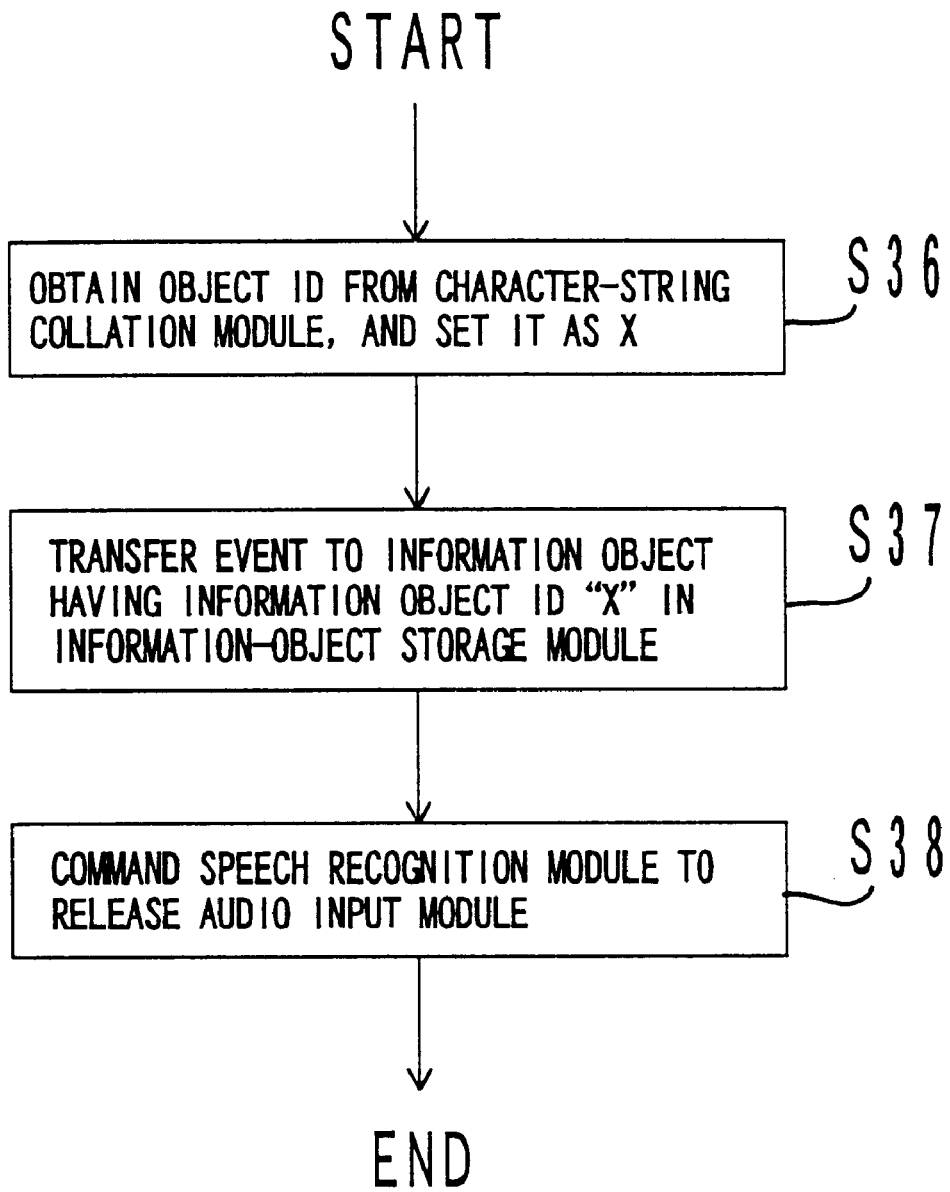
FIG. 25 is a flowchart showing an audio-input releasing process which is executed by an event commencement module depicted in FIG. 24.

FIG. 25 is a flowchart showing an audio-input releasing process which is executed by the event commencement module 9 in the fifteenth aspect of performance illustrated in FIG. 24. Referring to FIG. 25, when the audio-input releasing process is started, the identifier ID of an information object is acquired from the character-string collation module 8 and is set as "X" at step S36. At step S37, an event for, for example, the activation of the information object is transferred for the object having the ID "X", among objects stored in the information-object storage module 3. At step S38, the speech recognition module 26 is commanded to release the audio input module 27. Then, the releasing process is ended.

Figure 26:
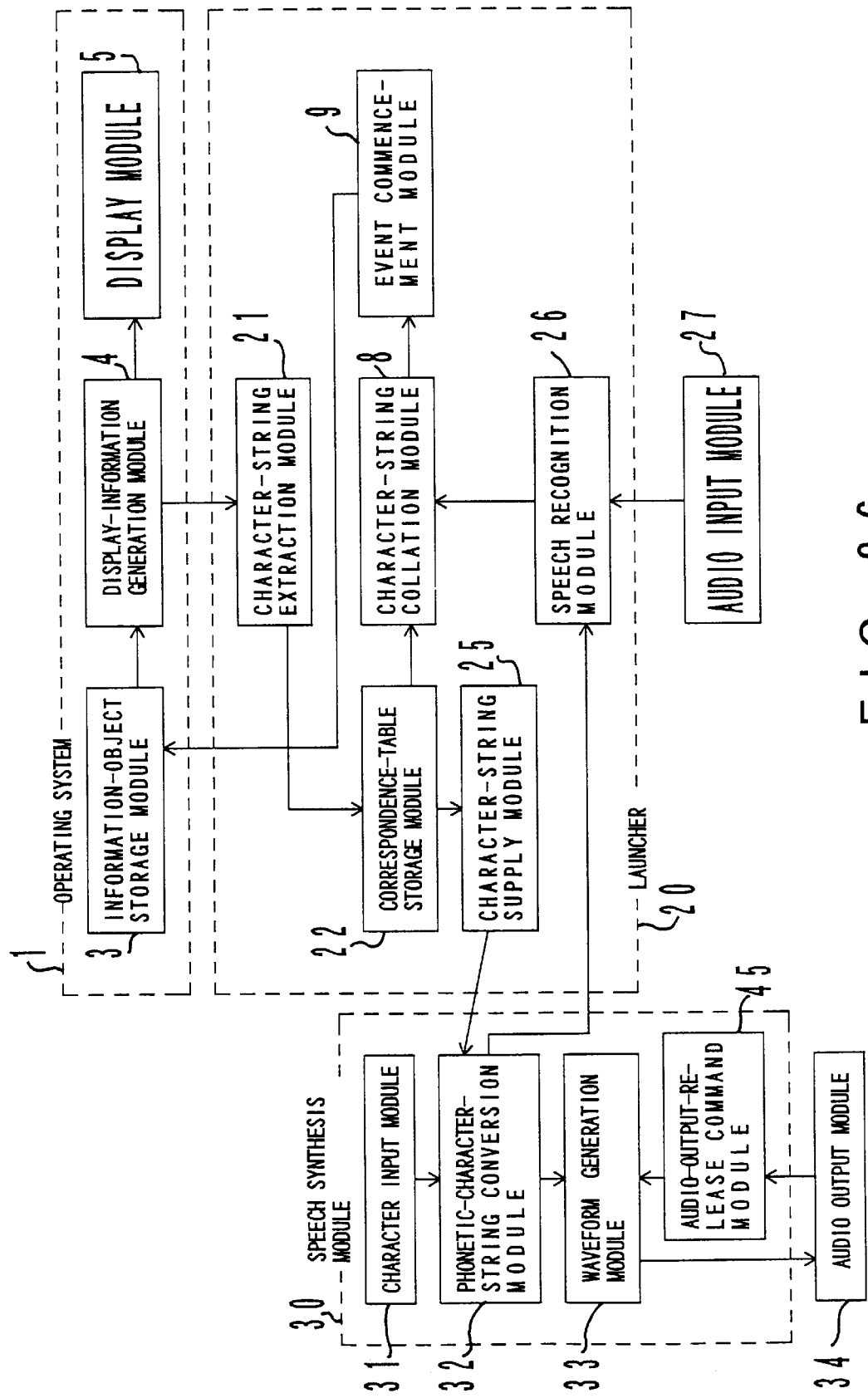
FIG. 26 is a block diagram showing an architecture in the sixteenth aspect of performance of an information-object designation system.

FIG. 26 is a block diagram showing an architecture in the sixteenth aspect of performance of an information-object designation system. As compared with the eighth aspect of performance illustrated in FIG. 13, the sixteenth aspect of performance illustrated in FIG. 26 differs in the point that an audio-output-release command module 45 is interposed between the audio output module 34 and the waveform generation module 33. Here, according to the sixteenth aspect of performance, after the speech synthesis module (or the speech synthesizer) 30 has outputted the name of an object to-be-activated, the audio-output-release command module 45 operates in order that the audio output module 34 may be released so that it can be utilized by any other part of the information processing system. More specifically, after having produced an audio output, the audio output module 34 notifies the audio-output-release command module 45 of the end of the audio output. Then, the audio-output-release command module 45 commands the side of the waveform generation module 33 to release the audio output module 34.

In the above description, it has been assumed that all data items, such as the character strings expressive of the names of the respective information objects, and the identification numbers (IDs), operations, contents and icons of the respective objects, be stored in the information-object storage module 3 included in the operating system 1 shown in, for example, FIG. 2B. It is also possible, however, that the data items concerning the information objects be distributively stored in a plurality of storage portions.

In general, the names of information objects are not constant in length, and it must be permitted to handle all the names from short names to very long names. In such a situation, when areas for storing the character strings expressive of the names are endowed with variable lengths in the table shown in FIG. 1B, the management of the table becomes complicated, and the processing speed of the information processing system lowers. In contrast, when the storage areas for the character strings expressive of the names are endowed with a fixed length, the areas of the maximum length need to be prepared for all the names, and the table becomes very large. It is therefore considered effective that the character strings being the names of the information objects are not possessed in an information-object storage module, but that the corresponding relations between the identification numbers (IDs) of the objects and the character strings expressive of the names of the objects are stored in another storage module.

Further considered is a form in which some of the data on the information objects are possessed in a program. When some data items are stored in the program in this manner, it can be expected to increase the processing speed, and hence, it is also effective to store the data of frequent uses in the program.

Lastly, the loading of a program into a computer system which incarnates the information-object designation system of the present invention will be explained with reference to FIG. 27. Referring to the figure, a computer 51 which incarnates the whole information processing system including the information-object designation system is configured of a computer proper 54 and a memory 55. The computer proper 54 can be loaded with the program etc. from a portable storage medium 52, and can also be loaded with the program etc. through a network 53 from the side of a program offerer.

Figure 27:
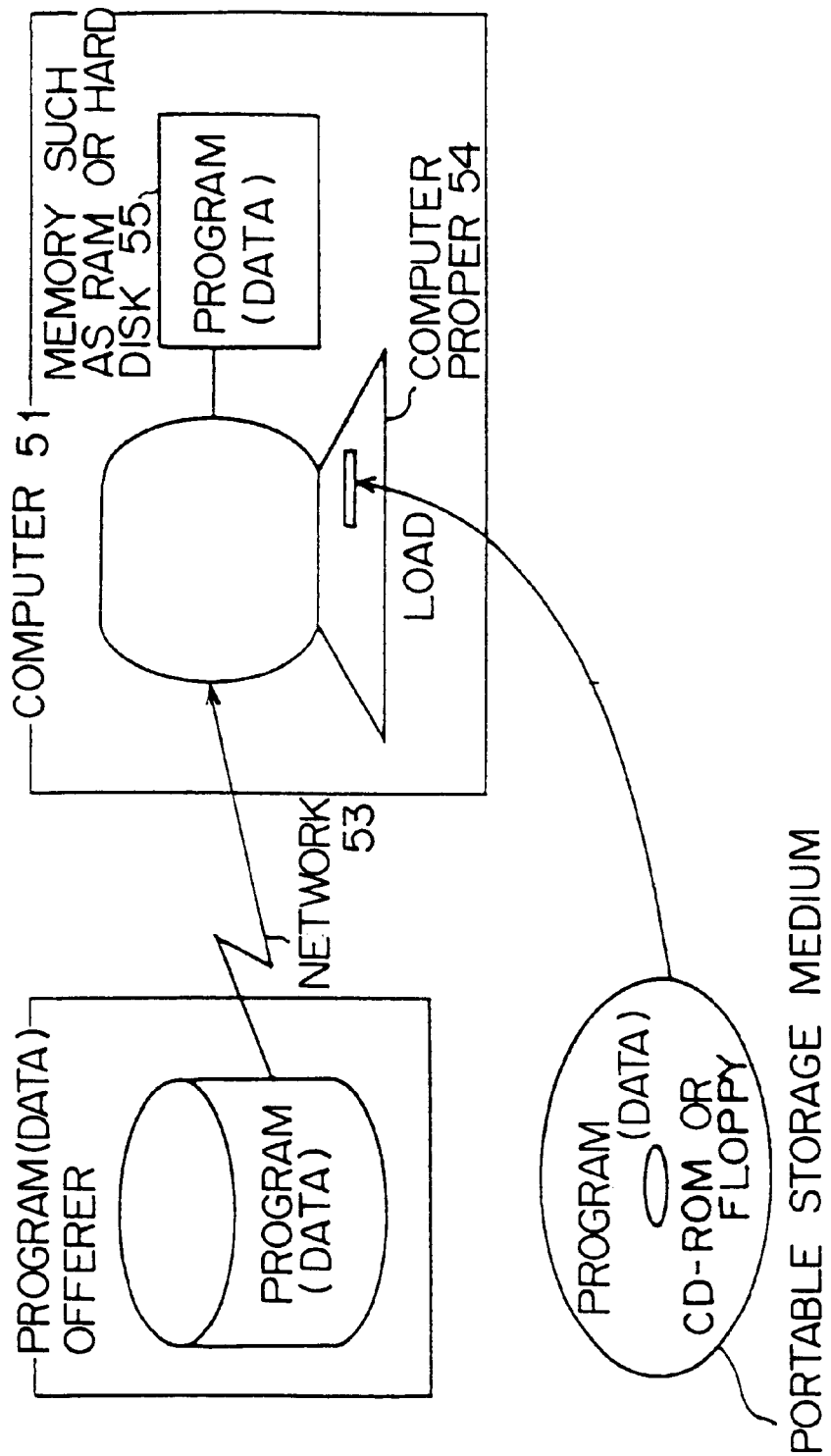
FIG. 27 is a schematic diagram for explaining the loading of a program into a computer system which incarnates an information-object designation system.

A program mentioned in claims 26 and 27 contained in the appended claims, and the programs illustrated in the flowcharts of FIGS. 4 through 6, FIG. 21 and FIG. 25 of the accompanying drawings, are stored in the memory 55 shown in FIG. 27 by way of example. The stored programs are developed in the unshown main storage of the computer proper 54 so as to be run. Here, the memory 55 is, for example, a random access memory (RAM) or a hard disk.

It is also possible that a program for automatically generating a correspondence table, or a program for comparing two character strings and commencing an event upon the detection of the match between the character strings, be stored in the portable storage medium 52, and that the program be loaded into the computer 51, whereby an information object, for example, to be activated is designated. Usable as the portable storage medium 52 is any of storage media which are put on or are distributable on the market, such as a memory card, a floppy disk, a CD-ROM (compact-disk read only memory), an optical disk and an opto-magnetic disk. Further, it is possible that a program for designating an information object, etc. be transmitted from the side of the program offerer to the side of the computer 51 through the network 53, and that the program be loaded, whereby an event for the designated object is commenced.

What is claimed is:

1. An information-object launching system commencing any of information objects stored in an information processing system, comprising:
    a character-string extraction unit extracting respective character strings which express names of information objects currently displayed on a display unit;
    a correspondence-table storage unit storing a correspondence between the character strings extracted by said character-string extraction unit and identification numbers of the objects;
    a character string supplier limiting subjects to be recognized by supplying to-be-recognized character strings from the correspondence-table storage unit;
    an input information recognizer recognizing an externally input information based upon the to-be-recognized character strings supplied by the character string supplier and generating an input character string;
    a character-string comparison unit comparing two character strings; a character string which expresses a name of an information object stored in said correspondence-table storage unit, and the generated input character string of the input information recognizer; and
    an event commencement unit commencing an event for an information object when said character-string comparison unit has detected a match of the two character strings, said information object having the name which is expressed by the matching character string.

2. The information-object launching system as defined in claim 1, further comprising:
    an information-object storage unit storing therein the names of each information object for which the event is commenced and an operating content to be executed in correspondence with the event, wherein said event commencement unit transfers said event to said information-object storage unit.

3. The information-object launching system as defined in claim 2, wherein said information-object storage unit is configured of a plurality of storage portions, and contents to be stored in said information-object storage unit are distributively stored in the respective storage portions.

4. The information-object launching system as defined in claim 3, wherein at least one of said plurality of storage portions is a storage portion storing a program therein and said storage portion storing the program therein stores within said program part of the contents to be stored in the information object .

5. The information-object launching system as defined in claim 1, wherein said input information recognizer is a keyboard.

6. The information-object launching system as defined in claim 1, wherein said input information recognizer is a handwritten-character recognition unit recognizing handwritten characters which are said externally input information.

7. The information-object launching system as defined in claim 6, further comprising:
    a speech synthesis unit synthesizing a result recognized by said handwritten-character recognition unit into a waveform of a synthesized voice; and
    an audio output unit outputting the synthesized voice.

8. The information-object launching system as defined in claim 7, further comprising:
    a handwritten-character recognized-result cancellation unit cancelling the recognized result of said handwritten-character recognition unit when an external voice input has been given during the output of said synthesized voice by said audio output unit or within a predetermined time period since an end of said output.

9. The information-object launching system as defined in claim 1, wherein said input information recognizer comprises:
    a speech recognition unit recognizing an externally input voice as the externally input information; and said speech recognition unit further comprises:
    an audio input unit inputting an input voice which is said externally input voice.

10. The information-object launching system as defined in claim 9, further comprising:
    a phonetic-character-string conversion unit converting said character strings output from said character-string supply unit, into phonetic character strings, and giving said speech recognition unit the converted results.

11. The information-object launching system as defined in claims 10, wherein said phonetic-character-string conversion unit is a shared phonetic-character-string conversion module which is one constituent of a speech synthesizer of said information processing system.

12. The information-object launching system as defined in claim 11, wherein said event commencement unit further comprises:
    a mouse unit calling the name of the displayed information object; said event commencement unit responsive to the calling transfers the event to said information-object storage unit, and even in a state in which said character-string comparison unit does not detect the match of said two character strings; and
    said speech synthesizer receives an output from said information-object storage module, and produces said name of said information object as a voice output.

13. The information-object launching system as defined in claim 12, wherein after the voice output of said name of said information object, said speech synthesizer releases an audio output module of its own and permits any other part of said information processing system to utilize said audio output module.

14. The information-object launching system as defined in claim 10, further comprising:
    a phonetic-character-string correction unit correcting the character string which is the converted result of said phonetic-character-string conversion unit, in accordance with an external instruction.

15. The information-object launching system as defined in claim 9, further comprising:
    a speech synthesis unit converting a result recognized by said speech recognition unit into a waveform of a synthesized voice; and
    an audio output unit for emitting the synthesized voice.

16. The information-object launching system as defined in claim 15, further comprising:

a speech-recognition-result cancellation unit cancelling the recognized result of said speech recognition unit when an external voice input has been given during the emission of said synthesized voice by said audio output unit or within a predetermined time period since an end of said emission.

17. The information-object launching system as defined in claim 9, further comprising:

a mouse unit instructing commencement of the event for the displayed information object to said event commencement unit; and said event commencement unit commences the event for said information object which has the displayed character string as its name, in response to the event commencing instruction and even in a state in which said character-string comparison unit does not detect the match of said two character strings.

18. The information-object launching system as defined in claim 17, further comprising:

a mouse-operation detection unit detecting a motion of said mouse unit and stopping the recognizing operation of said speech recognition unit while an external input operation is being performed with said mouse unit.

19. The information-object launching system as defined in claim 9, wherein after the commencement of said event by said event commencement unit, said speech recognition unit releases said audio input unit and permits any other part of said information processing system to utilize said audio input unit.

20. The information-object launching system as defined in claim 1, further comprising:

a mouse unit instructing commencement of the event for the displayed information object to said event commencement unit; and said event commencement unit commences the event for said information object which has the displayed character string as its name, in response to the event commencing instruction and even in a state in which said character-string comparison unit does not detect the match of said two character strings.

21. A computer-readable storage controlling a computer and comprising an information-processing-system object launching process of:

extracting character strings expressing names of information objects currently displayed on a display unit;

storing a correspondence between the extracted character strings and identification numbers of the information objects;

limiting subjects to be recognized by supplying to-be-recognized character strings from the stored correspondence information;

recognizing externally input information based upon the to-be-recognized character strings supplied according to the limiting and generating an externally input character string;

comparing the externally input character string with the stored extracted character strings;

commencing an event for an information object when an extracted character string expressing a name of the information object matches the externally input character string based upon the comparing.

22. The computer-readable storage medium of claim 21, wherein the event is transferred to an information-object storage module in which the name of the information object and an operating content to be executed in correspondence with the event are stored.

23. An information-object launching method commencing any of information objects stored in an information processing system, comprising:

extracting character strings expressing names of information objects currently displayed on a display unit;

storing a correspondence between the extracted character strings and identification numbers of the information objects;

limiting subjects to be recognized by supplying to-be-recognized character strings from the correspondence information;

recognizing externally input information based upon the to-be-recognized character strings according to the limiting and generating an externally input character string;

comparing the externally input character string with the stored extracted character strings;

commencing an event for an information object when an extracted character string expressing a name of the information object matches the externally input character string based upon the comparing.

24. The information-object launching method as defined in claim 23, wherein said event is transferred to an information-object storage module in which said name of said each information object and an operating content to be executed in correspondence with said event are stored.

25. An information-object launching system for commencing information objects stored in an information processing system, comprising:

character-string extraction means for extracting respective character strings which express names of information objects currently displayed;

correspondence-table storage means for storing a correspondence between the character strings extracted by said character-string extraction means and identification numbers of the objects;

deviation establishment means for establishing a magnitude of acceptable deviation between externally input information and the stored extracted character strings based upon the stored extracted character strings;

character-string comparison means for comparing two character strings, a character string which expresses a name of an information object stored in said correspondence-table storage means, and a character string which is based on the externally input information; and event commencement means for commencing an event for the information object when said character-string comparison means has detected a match of the two character strings, said information object having the name which is expressed by the matching character string.

26. An information-object launching system, comprising:

an operating system segment storing names of information objects with corresponding identification numbers, displaying the names of the information objects and executing the information objects; and a launcher automatically extracting the displayed names of the information objects and storing a correspondence between the extracted names and the identification numbers, receiving input information according to an established magnitude of acceptable deviation between the input information and the stored extracted names based upon the stored extracted names, comparing the input information with the extracted names of the information objects, commencing an event to execute the information objects by the operating system when a name of an information object matches the input information based upon the comparing.

27. The system of claim 26, wherein the input information is audio information.

* * * * *

UNITED STATES PATENT AND TRADEMARK OFFICE
CERTIFICATE OF CORRECTION

PATENT NO. : 6,804,817 B1
DATED : October 12, 2004
INVENTOR(S) : Shinta Kimura et al.

It is certified that error appears in the above-identified patent and that said Letters Patent is hereby corrected as shown below:

<u>Title page,</u>
Item [56], References Cited, OTHER PUBLICATIONS, "Long, Allan Christian et al." reference, change "Termainal" to -- Terminal --;

<u>Column 15,</u>
Line 39, change "of" to -- by --.

Signed and Sealed this

Third Day of May, 2005

JON W. DUDAS
*Director of the United States Patent and Trademark Office*